United States Patent
Kuester

(10) Patent No.: US 9,694,752 B2
(45) Date of Patent: Jul. 4, 2017

(54) FULL DISPLAY MIRROR ACTUATOR

(71) Applicant: Gentex Corporation, Zeeland, MI (US)

(72) Inventor: Ulrich A. Kuester, Spring Lake, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 14/934,528

(22) Filed: Nov. 6, 2015

(65) Prior Publication Data

US 2016/0129842 A1    May 12, 2016

Related U.S. Application Data

(60) Provisional application No. 62/076,542, filed on Nov. 7, 2014.

(51) Int. Cl.
*H04N 5/225* (2006.01)
*B60R 1/12* (2006.01)
(Continued)

(52) U.S. Cl.
CPC ............. *B60R 1/12* (2013.01); *B60K 35/00* (2013.01); *G02B 27/0101* (2013.01);
(Continued)

(58) Field of Classification Search
CPC .... B60K 2350/927; B60K 35/00; B60R 1/12; B60R 2001/1253; G02B 2027/0138;
(Continued)

(56) References Cited

U.S. PATENT DOCUMENTS 2,131,888 A    10/1938 Harris
2,632,040 A    3/1953 Rabinow
(Continued)

FOREIGN PATENT DOCUMENTS

DE    102010064082 A1    6/2012
EP        0513476        11/1992
(Continued)

OTHER PUBLICATIONS

Palalau et al., "FPD Evaluation for Automotive Application," Proceedings of the Vehicle Display Symposium, Nov. 2, 1995, pp. 97-103, Society for Information Display, Detroit Chapter, Santa Ana, CA.

(Continued)

*Primary Examiner* — Shan Elahi
(74) *Attorney, Agent, or Firm* — Price Heneveld LLP; Bradley D. Johnson

(57) ABSTRACT

A rearview mirror for a vehicle includes a housing defining an interior cavity and an open side and further includes a substrate having a reflective surface thereon extending within the open side of the housing and an actuation mechanism moveably coupling the substrate with the housing. The actuation mechanism includes a mounting plate rotatably coupled within the cavity at a first end thereof. The mounting plate defines a socket open opposite the first end and first and second scalloped surfaces adjacent the socket. The actuation mechanism further includes an actuation wheel rotatably coupled within the cavity of the housing and engageable with the socket to cause rotation of the mounting plate and engageable with the first scalloped surface to secure the mounting plate in a first position and with the second scalloped surface to secure the mounting plate in a second position.

20 Claims, 6 Drawing Sheets

(51) Int. Cl.
  *B60K 35/00* (2006.01)
  *G02B 27/01* (2006.01)
(52) U.S. Cl.
  CPC . *B60K 2350/927* (2013.01); *B60R 2001/1253* (2013.01); *G02B 2027/0138* (2013.01); *G02B 2027/0141* (2013.01)
(58) Field of Classification Search
  CPC ........ G02B 2027/0141; G02B 27/0101; H04N 5/2252; H04N 5/23293
  USPC ........................................................ 348/148
  See application file for complete search history.

(56) References Cited

U.S. PATENT DOCUMENTS

| | | |
|---|---|---|
| 2,827,594 A | 3/1958 | Rabinow |
| 3,179,845 A | 4/1965 | Kulwiec |
| 3,280,701 A | 10/1966 | Donnelly et al. |
| 3,467,465 A * | 9/1969 | Van Noord ............. B60R 1/086 248/479 |
| 3,581,276 A | 5/1971 | Newman |
| 3,663,819 A | 5/1972 | Hicks et al. |
| 3,837,129 A | 9/1974 | Losell |
| 4,109,235 A | 8/1978 | Bouthors |
| 4,139,801 A | 2/1979 | Linares |
| 4,151,526 A | 4/1979 | Hinachi et al. |
| 4,214,266 A | 7/1980 | Myers |
| 4,236,099 A | 11/1980 | Rosenblum |
| 4,257,703 A | 3/1981 | Goodrich |
| 4,258,979 A | 3/1981 | Mahin |
| 4,277,804 A | 7/1981 | Robison |
| 4,286,308 A | 8/1981 | Wolff |
| 4,310,851 A | 1/1982 | Pierrat |
| 4,357,558 A | 11/1982 | Massoni et al. |
| 4,376,909 A | 3/1983 | Tagami et al. |
| 4,479,173 A | 10/1984 | Rumpakis |
| 4,499,451 A | 2/1985 | Suzuki et al. |
| D283,998 S | 5/1986 | Tanaka |
| 4,599,544 A | 7/1986 | Martin |
| 4,630,904 A | 12/1986 | Pastore |
| 4,638,287 A | 1/1987 | Umebayashi et al. |
| 4,640,583 A | 2/1987 | Hoshikawa et al. |
| 4,645,975 A | 2/1987 | Meitzler et al. |
| 4,646,158 A | 2/1987 | Ohno et al. |
| 4,665,321 A | 5/1987 | Chang et al. |
| 4,665,430 A | 5/1987 | Hiroyasu |
| 4,692,798 A | 9/1987 | Seko et al. |
| 4,702,566 A | 10/1987 | Tukude |
| 4,716,298 A | 12/1987 | Etoh |
| 4,727,290 A | 2/1988 | Smith et al. |
| 4,740,838 A | 4/1988 | Mase et al. |
| 4,768,135 A | 8/1988 | Kretschmer et al. |
| 4,862,037 A | 8/1989 | Farber et al. |
| 4,891,559 A | 1/1990 | Matsumoto et al. |
| 4,893,908 A | 1/1990 | Wolf et al. |
| 4,902,108 A | 2/1990 | Byker |
| 4,910,591 A | 3/1990 | Petrossian et al. |
| 4,917,477 A | 4/1990 | Bechtel et al. |
| 4,930,742 A | 6/1990 | Schofield et al. |
| 4,934,273 A | 6/1990 | Endriz |
| 4,967,319 A | 10/1990 | Seko |
| 5,004,961 A | 4/1991 | Berner et al. |
| 5,005,213 A | 4/1991 | Hanson et al. |
| 5,008,946 A | 4/1991 | Ando |
| 5,027,200 A | 6/1991 | Petrossian et al. |
| 5,036,437 A | 7/1991 | Macks |
| 5,052,163 A | 10/1991 | Czekala |
| 5,066,111 A | 11/1991 | Singleton et al. |
| 5,066,112 A | 11/1991 | Lynam et al. |
| 5,069,535 A | 12/1991 | Baucke et al. |
| 5,072,154 A | 12/1991 | Chen |
| 5,073,012 A | 12/1991 | Lynam |
| 5,076,673 A | 12/1991 | Lynam et al. |
| 5,086,253 A | 2/1992 | Lawler |
| 5,092,939 A | 3/1992 | Nath et al. |
| 5,096,287 A | 3/1992 | Kakinami et al. |
| 5,115,346 A | 5/1992 | Lynam |
| 5,121,200 A | 6/1992 | Choi et al. |
| 5,124,549 A | 6/1992 | Michaels et al. |
| 5,124,832 A | 6/1992 | Greenberg et al. |
| 5,128,799 A | 7/1992 | Byker |
| 5,136,419 A | 8/1992 | Shabrang |
| 5,151,824 A | 9/1992 | O'Farrell |
| 5,158,638 A | 10/1992 | Osanami et al. |
| 5,161,048 A | 11/1992 | Rukavina |
| 5,166,681 A | 11/1992 | Bottesch et al. |
| 5,182,502 A | 1/1993 | Slotkowski et al. |
| 5,187,383 A | 2/1993 | Taccetta et al. |
| 5,197,562 A | 3/1993 | Kakinami et al. |
| 5,202,787 A | 4/1993 | Byker et al. |
| 5,228,925 A | 7/1993 | Nath et al. |
| 5,230,400 A | 7/1993 | Kakainami et al. |
| 5,235,178 A | 8/1993 | Hegyi |
| 5,243,417 A | 9/1993 | Pollard |
| 5,253,109 A | 10/1993 | O'Farrell et al. |
| 5,278,693 A | 1/1994 | Theiste |
| 5,280,380 A | 1/1994 | Byker |
| 5,282,077 A | 1/1994 | Byker |
| 5,289,321 A | 2/1994 | Secor |
| 5,294,376 A | 3/1994 | Byker |
| 5,296,924 A | 3/1994 | Blancard et al. |
| D346,356 S | 4/1994 | Leu |
| 5,304,980 A | 4/1994 | Maekawa |
| 5,329,206 A | 7/1994 | Slotkowski et al. |
| 5,336,448 A | 8/1994 | Byker |
| 5,347,261 A | 9/1994 | Adell |
| 5,347,459 A | 9/1994 | Greenspan et al. |
| 5,355,146 A | 10/1994 | Chiu et al. |
| 5,379,104 A | 1/1995 | Takao |
| 5,379,146 A | 1/1995 | Defendini |
| 5,381,309 A | 1/1995 | Borchardt |
| 5,384,578 A | 1/1995 | Lynam et al. |
| 5,384,653 A | 1/1995 | Benson et al. |
| 5,386,285 A | 1/1995 | Asayama |
| 5,396,054 A | 3/1995 | Krichever et al. |
| 5,402,170 A | 3/1995 | Parulski et al. |
| 5,408,357 A | 4/1995 | Beukema |
| 5,414,461 A | 5/1995 | Kishi et al. |
| 5,416,318 A | 5/1995 | Hegyi |
| 5,418,610 A | 5/1995 | Fischer |
| 5,421,940 A | 6/1995 | Cornils et al. |
| 5,424,952 A | 6/1995 | Asayama |
| 5,426,294 A | 6/1995 | Kobayashi et al. |
| 5,428,464 A | 6/1995 | Silverbrook |
| 5,430,450 A | 7/1995 | Holmes |
| 5,434,407 A | 7/1995 | Bauer et al. |
| 5,448,397 A | 9/1995 | Tonar |
| 5,451,822 A | 9/1995 | Bechtel et al. |
| 5,452,004 A | 9/1995 | Roberts |
| 5,469,298 A | 11/1995 | Suman et al. |
| 5,471,515 A | 11/1995 | Fossum et al. |
| 5,475,441 A | 12/1995 | Parulski et al. |
| 5,475,494 A | 12/1995 | Nishida et al. |
| 5,481,268 A | 1/1996 | Higgins |
| 5,483,346 A | 1/1996 | Butzer |
| 5,483,453 A | 1/1996 | Uemura et al. |
| 5,485,155 A | 1/1996 | Hibino |
| 5,485,378 A | 1/1996 | Franke et al. |
| 5,488,496 A | 1/1996 | Pine |
| 5,508,592 A | 4/1996 | Lapatovich et al. |
| 5,515,448 A | 5/1996 | Nishitani |
| 5,523,811 A | 6/1996 | Wada et al. |
| 5,530,421 A | 6/1996 | Marshall et al. |
| 5,535,144 A | 7/1996 | Kise |
| 5,537,003 A | 7/1996 | Bechtel et al. |
| 5,541,590 A | 7/1996 | Nishio |
| 5,541,724 A | 7/1996 | Hoashi |
| 5,550,677 A | 8/1996 | Schofield et al. |
| 5,554,912 A | 9/1996 | Thayer et al. |
| 5,574,443 A | 11/1996 | Hsieh |
| 5,574,463 A | 11/1996 | Shirai et al. |
| 5,576,975 A | 11/1996 | Sasaki et al. |
| 5,587,929 A | 12/1996 | League et al. |

(56) References Cited

U.S. PATENT DOCUMENTS

| | | | |
|---|---|---|---|
| 5,592,146 A | 1/1997 | Kover, Jr. et al. |
| 5,602,542 A | 2/1997 | Windmann et al. |
| 5,612,847 A | 3/1997 | Malecke et al. |
| 5,614,788 A | 3/1997 | Mullins et al. |
| 5,615,023 A | 3/1997 | Yang |
| 5,617,085 A | 4/1997 | Tsutsumi et al. |
| 5,621,460 A | 4/1997 | Hatlestad et al. |
| 5,634,709 A | 6/1997 | Iwama |
| 5,642,238 A | 6/1997 | Sala |
| 5,646,614 A | 7/1997 | Abersfelder et al. |
| 5,649,756 A | 7/1997 | Adams et al. |
| 5,650,765 A | 7/1997 | Park |
| 5,654,736 A | 8/1997 | Green et al. |
| 5,657,149 A | 8/1997 | Buffat et al. |
| 5,660,454 A | 8/1997 | Mori et al. |
| 5,666,028 A | 9/1997 | Bechtel et al. |
| 5,670,935 A | 9/1997 | Schofield et al. |
| 5,679,283 A | 10/1997 | Tonar |
| 5,680,123 A | 10/1997 | Lee |
| 5,682,267 A | 10/1997 | Tonar |
| 5,684,473 A | 11/1997 | Hibino et al. |
| 5,689,370 A | 11/1997 | Tonar |
| 5,707,129 A | 1/1998 | Kobayashi |
| 5,708,410 A | 1/1998 | Blank et al. |
| 5,708,857 A | 1/1998 | Ishibashi |
| 5,710,565 A | 1/1998 | Shirai et al. |
| 5,714,751 A | 2/1998 | Chen |
| 5,715,093 A | 2/1998 | Schierbeek et al. |
| 5,724,176 A | 3/1998 | Nishikitani et al. |
| 5,724,187 A | 3/1998 | Varaprasad et al. |
| 5,725,809 A | 3/1998 | Varaprasad et al. |
| 5,729,194 A | 3/1998 | Spears et al. |
| 5,736,816 A | 4/1998 | Strenke et al. |
| 5,742,026 A | 4/1998 | Dickinson, Jr. |
| 5,745,050 A | 4/1998 | Nakagawa |
| 5,751,211 A | 5/1998 | Shirai et al. |
| 5,751,832 A | 5/1998 | Panter et al. |
| 5,754,099 A | 5/1998 | Nishimura et al. |
| 5,760,828 A | 6/1998 | Cortes |
| 5,764,139 A | 6/1998 | Nojima et al. |
| 5,767,793 A | 6/1998 | Agravante et al. |
| 5,781,105 A | 7/1998 | Bitar et al. |
| 5,786,787 A | 7/1998 | Eriksson et al. |
| 5,790,298 A | 8/1998 | Tonar |
| 5,793,308 A | 8/1998 | Rosinski et al. |
| 5,793,420 A | 8/1998 | Schmidt |
| 5,796,094 A | 8/1998 | Schofield et al. |
| 5,798,727 A | 8/1998 | Shirai et al. |
| 5,803,579 A | 9/1998 | Turnbull |
| 5,805,330 A | 9/1998 | Byker et al. |
| 5,808,778 A | 9/1998 | Bauer et al. |
| 5,811,888 A | 9/1998 | Hsieh |
| 5,812,321 A | 9/1998 | Schierbeek et al. |
| 5,818,625 A | 10/1998 | Forgette et al. |
| 5,825,527 A | 10/1998 | Forgette et al. |
| D400,481 S | 11/1998 | Stephens et al. |
| D401,200 S | 11/1998 | Huang |
| 5,837,994 A | 11/1998 | Stam et al. |
| 5,838,483 A | 11/1998 | Teowee et al. |
| 5,841,126 A | 11/1998 | Fossum et al. |
| 5,844,505 A | 12/1998 | Van Ryzin |
| 5,845,000 A | 12/1998 | Breed et al. |
| 5,850,176 A | 12/1998 | Kinoshita et al. |
| 5,867,214 A | 2/1999 | Anderson et al. |
| 5,877,897 A | 3/1999 | Schofield et al. |
| 5,883,739 A | 3/1999 | Ashihara et al. |
| 5,888,431 A | 3/1999 | Tonar et al. |
| 5,889,608 A | 3/1999 | Buffat et al. |
| 5,896,119 A | 4/1999 | Evanicky et al. |
| 5,904,729 A | 5/1999 | Ruzicka |
| 5,905,457 A | 5/1999 | Rashid |
| D410,607 S | 6/1999 | Carter |
| 5,912,534 A | 6/1999 | Benedict |
| 5,923,027 A | 7/1999 | Stam et al. |
| 5,923,457 A | 7/1999 | Byker et al. |
| 5,928,572 A | 7/1999 | Tonar et al. |
| 5,935,613 A | 8/1999 | Benham et al. |
| 5,940,011 A | 8/1999 | Agravante et al. |
| 5,940,201 A | 8/1999 | Ash et al. |
| 5,942,853 A | 8/1999 | Piscart |
| 5,949,331 A | 9/1999 | Schofield et al. |
| 5,956,012 A | 9/1999 | Turnbull et al. |
| 5,956,079 A | 9/1999 | Ridgley |
| 5,956,181 A * | 9/1999 | Lin .................... B60R 1/12 359/630 |
| 5,959,555 A | 9/1999 | Furuta |
| 5,990,469 A | 11/1999 | Bechtel et al. |
| 5,995,273 A | 11/1999 | Chandrasekhar |
| 5,998,617 A | 12/1999 | Srinivasa |
| 6,002,511 A | 12/1999 | Varaprasad |
| 6,008,486 A | 12/1999 | Stam et al. |
| 6,009,359 A | 12/1999 | El-Hakim et al. |
| 6,018,308 A | 1/2000 | Shirai |
| 6,020,987 A | 2/2000 | Baumann |
| 6,020,989 A | 2/2000 | Watanabe |
| 6,023,040 A | 2/2000 | Zahavi |
| 6,023,229 A | 2/2000 | Bugno et al. |
| 6,025,872 A | 2/2000 | Ozaki et al. |
| 6,037,471 A | 3/2000 | Srinivasa |
| 6,043,452 A | 3/2000 | Bestenlehrer |
| 6,045,724 A | 4/2000 | Varaprasad et al. |
| 6,046,766 A | 4/2000 | Sakata |
| 6,049,171 A | 4/2000 | Stam et al. |
| 6,051,956 A | 4/2000 | Nakashimo |
| 6,055,089 A | 4/2000 | Schulz et al. |
| 6,056,410 A | 5/2000 | Hoekstra et al. |
| 6,060,989 A | 5/2000 | Gehlot |
| 6,061,002 A | 5/2000 | Weber et al. |
| 6,062,920 A | 5/2000 | Jordan |
| 6,064,508 A | 5/2000 | Forgette et al. |
| 6,064,509 A | 5/2000 | Tonar et al. |
| 6,067,111 A | 5/2000 | Hahn et al. |
| 6,068,380 A | 5/2000 | Lynn et al. |
| 6,072,391 A | 6/2000 | Suzuki et al. |
| 6,078,355 A | 6/2000 | Zengel |
| 6,084,700 A | 7/2000 | Knapp |
| 6,084,702 A | 7/2000 | Byker et al. |
| 6,097,023 A | 8/2000 | Schofield et al. |
| 6,102,546 A | 8/2000 | Carter |
| 6,106,121 A | 8/2000 | Buckley et al. |
| 6,111,498 A | 8/2000 | Jobes et al. |
| 6,111,683 A | 8/2000 | Cammenga |
| 6,111,684 A | 8/2000 | Forgette |
| 6,115,651 A | 9/2000 | Cruz |
| 6,122,597 A | 9/2000 | Saneyoshi et al. |
| 6,128,576 A | 10/2000 | Nishimoto et al. |
| 6,130,421 A | 10/2000 | Bechtel et al. |
| 6,130,448 A | 10/2000 | Bauer et al. |
| 6,132,072 A | 10/2000 | Turnbull |
| 6,140,933 A | 10/2000 | Bugno et al. |
| 6,144,158 A | 11/2000 | Beam |
| 6,151,065 A | 11/2000 | Steed et al. |
| 6,151,539 A | 11/2000 | Bergholz et al. |
| 6,154,149 A | 11/2000 | Tychkowski et al. |
| 6,157,294 A | 12/2000 | Urai et al. |
| 6,166,496 A | 12/2000 | Lys et al. |
| 6,166,628 A | 12/2000 | Andreas |
| 6,166,698 A | 12/2000 | Turnbull et al. |
| 6,166,848 A | 12/2000 | Cammenga et al. |
| 6,167,755 B1 | 1/2001 | Damson et al. |
| 6,170,956 B1 | 1/2001 | Rumsey et al. |
| 6,172,600 B1 | 1/2001 | Kakinami et al. |
| 6,172,601 B1 | 1/2001 | Wada et al. |
| 6,175,300 B1 | 1/2001 | Kendrick |
| 6,184,781 B1 | 2/2001 | Ramakesavan |
| 6,185,492 B1 | 2/2001 | Kagawa et al. |
| 6,188,505 B1 | 2/2001 | Lomprey |
| 6,191,704 B1 | 2/2001 | Takenaga et al. |
| 6,193,378 B1 | 2/2001 | Tonar et al. |
| 6,193,912 B1 | 2/2001 | Thieste |
| 6,195,194 B1 | 2/2001 | Roberts et al. |
| 6,200,010 B1 | 3/2001 | Anders |
| 6,207,083 B1 | 3/2001 | Varaprasad et al. |
| 6,210,008 B1 | 4/2001 | Hoekstra et al. |

(56) References Cited

U.S. PATENT DOCUMENTS

| | | |
|---|---|---|
| 6,218,934 B1 | 4/2001 | Regan |
| 6,222,177 B1 | 4/2001 | Bechtel |
| 6,222,447 B1 | 4/2001 | Schofield et al. |
| 6,224,716 B1 | 5/2001 | Yoder |
| 6,229,435 B1 | 5/2001 | Knapp |
| 6,239,898 B1 | 5/2001 | Byker |
| 6,239,899 B1 | 5/2001 | DeVries et al. |
| 6,244,716 B1 | 6/2001 | Steenwyk |
| 6,245,262 B1 | 6/2001 | Varaprasad et al. |
| 6,246,507 B1 | 6/2001 | Bauer |
| 6,247,819 B1 | 6/2001 | Turnbull |
| 6,249,214 B1 | 6/2001 | Kashiwazaki |
| 6,249,369 B1 | 6/2001 | Theiste et al. |
| 6,250,766 B1 | 6/2001 | Strumolo et al. |
| 6,254,003 B1 | 7/2001 | Pettinelli et al. |
| 6,255,639 B1 | 7/2001 | Stam et al. |
| 6,259,475 B1 | 7/2001 | Ramachandran et al. |
| 6,262,831 B1 | 7/2001 | Bauer |
| 6,262,832 B1 | 7/2001 | Lomprey |
| 6,265,968 B1 | 7/2001 | Betzitza et al. |
| 6,268,803 B1 | 7/2001 | Gunderson et al. |
| 6,268,950 B1 | 7/2001 | Ash |
| 6,269,308 B1 | 7/2001 | Kodaka et al. |
| 6,281,632 B1 | 8/2001 | Stam et al. |
| 6,281,804 B1 | 8/2001 | Haller et al. |
| 6,289,332 B2 | 9/2001 | Menig et al. |
| 6,291,812 B1 | 9/2001 | Bechtel |
| 6,300,879 B1 | 10/2001 | Regan et al. |
| 6,304,173 B2 | 10/2001 | Pala et al. |
| 6,313,457 B1 | 11/2001 | Bauer |
| 6,313,892 B2 | 11/2001 | Gleckman |
| 6,317,057 B1 | 11/2001 | Lee |
| 6,317,248 B1 | 11/2001 | Agrawal et al. |
| 6,320,612 B1 | 11/2001 | Young |
| 6,321,159 B1 * | 11/2001 | Nohtomi ............... B62D 1/28 340/903 |
| 6,324,295 B1 | 11/2001 | Valery et al. |
| D451,869 S | 12/2001 | Knapp et al. |
| 6,329,925 B1 | 12/2001 | Skiver et al. |
| 6,330,511 B2 | 12/2001 | Ogura et al. |
| 6,335,548 B1 | 1/2002 | Roberts |
| 6,335,680 B1 | 1/2002 | Matsuoka |
| 6,344,805 B1 | 2/2002 | Yasui et al. |
| 6,348,858 B2 | 2/2002 | Weis et al. |
| 6,349,450 B1 * | 2/2002 | Koops ............... E05B 17/0016 16/430 |
| 6,349,782 B1 | 2/2002 | Sekiya et al. |
| 6,356,206 B1 | 3/2002 | Takenaga et al. |
| 6,356,376 B1 | 3/2002 | Tonar et al. |
| 6,357,883 B1 | 3/2002 | Strumolo et al. |
| 6,359,274 B1 | 3/2002 | Nixon |
| 6,363,326 B1 | 3/2002 | Scully |
| 6,369,701 B1 | 4/2002 | Yoshida et al. |
| 6,379,013 B1 | 4/2002 | Bechtel et al. |
| 6,392,783 B1 | 5/2002 | Lomprey |
| 6,396,040 B1 | 5/2002 | Hill |
| 6,396,397 B1 | 5/2002 | Bos et al. |
| 6,402,328 B1 | 6/2002 | Bechtel |
| 6,403,942 B1 | 6/2002 | Stam |
| 6,407,468 B1 | 6/2002 | LeVesque et al. |
| 6,407,847 B1 | 6/2002 | Poll et al. |
| 6,408,247 B1 | 6/2002 | Ichikawa et al. |
| 6,412,959 B1 | 7/2002 | Tseng |
| 6,415,230 B1 | 7/2002 | Maruko et al. |
| 6,420,800 B1 | 7/2002 | LeVesque |
| 6,421,081 B1 | 7/2002 | Markus |
| 6,424,272 B1 | 7/2002 | Gutta et al. |
| 6,424,273 B1 | 7/2002 | Gutta et al. |
| 6,424,892 B1 | 7/2002 | Matsuoka |
| 6,426,485 B1 | 7/2002 | Bulgajewski |
| 6,428,172 B1 | 8/2002 | Hutzel et al. |
| 6,429,594 B1 | 8/2002 | Stam |
| 6,433,680 B1 | 8/2002 | Ho |
| 6,437,688 B1 | 8/2002 | Kobayashi |
| 6,438,491 B1 | 8/2002 | Farmer |
| 6,441,872 B1 | 8/2002 | Ho |
| 6,441,943 B1 | 8/2002 | Roberts |
| 6,442,465 B2 | 8/2002 | Breed et al. |
| 6,443,585 B1 | 9/2002 | Saccomanno |
| 6,443,602 B1 | 9/2002 | Tanabe et al. |
| 6,447,128 B1 | 9/2002 | Lang et al. |
| 6,452,533 B1 | 9/2002 | Yamabuchi et al. |
| 6,463,369 B2 | 10/2002 | Sadano et al. |
| 6,465,962 B1 | 10/2002 | Fu et al. |
| 6,465,963 B1 | 10/2002 | Turnbull |
| 6,466,701 B1 | 10/2002 | Ejiri et al. |
| 6,469,739 B1 | 10/2002 | Bechtel et al. |
| 6,471,360 B2 | 10/2002 | Rukavina et al. |
| 6,471,362 B1 | 10/2002 | Carter |
| 6,472,977 B1 | 10/2002 | Pochmuller |
| 6,473,001 B1 | 10/2002 | Blum |
| 6,476,731 B1 | 11/2002 | Miki et al. |
| 6,476,855 B1 | 11/2002 | Yamamoto |
| 6,483,429 B1 | 11/2002 | Yasui et al. |
| 6,483,438 B2 | 11/2002 | DeLine et al. |
| 6,487,500 B2 | 11/2002 | Lemelson et al. |
| 6,491,416 B1 | 12/2002 | Strazzanti |
| 6,498,620 B2 | 12/2002 | Schofield et al. |
| 6,501,387 B2 | 12/2002 | Skiver et al. |
| 6,504,142 B2 | 1/2003 | Nixon |
| 6,507,779 B2 | 1/2003 | Breed et al. |
| 6,512,624 B2 | 1/2003 | Tonar |
| 6,515,581 B1 | 2/2003 | Ho |
| 6,515,597 B1 | 2/2003 | Wada et al. |
| 6,520,667 B1 | 2/2003 | Mousseau |
| 6,521,916 B2 | 2/2003 | Roberts |
| 6,522,969 B2 | 2/2003 | Kannonji |
| 6,523,976 B1 | 2/2003 | Turnbull |
| D471,847 S | 3/2003 | Rumsey et al. |
| 6,535,126 B2 | 3/2003 | Lin et al. |
| 6,542,085 B1 | 4/2003 | Yang |
| 6,542,182 B1 | 4/2003 | Chutorash |
| 6,545,598 B1 | 4/2003 | de Villeroche |
| 6,545,794 B2 | 4/2003 | Ash |
| 6,550,943 B2 | 4/2003 | Strazzanti |
| 6,553,130 B1 | 4/2003 | Lemelson et al. |
| 6,558,026 B2 | 5/2003 | Strazzanti |
| 6,559,761 B1 | 5/2003 | Miller et al. |
| 6,567,708 B1 | 5/2003 | Bechtel et al. |
| 6,572,233 B1 | 6/2003 | Northman et al. |
| 6,575,643 B2 | 6/2003 | Takahashi |
| 6,580,373 B1 | 6/2003 | Ohashi |
| 6,581,007 B2 | 6/2003 | Hasegawa et al. |
| 6,583,730 B2 | 6/2003 | Lang et al. |
| 6,587,573 B1 | 7/2003 | Stam et al. |
| 6,591,192 B2 | 7/2003 | Okamura et al. |
| 6,594,583 B2 | 7/2003 | Ogura et al. |
| 6,594,614 B2 | 7/2003 | Studt et al. |
| 6,606,183 B2 | 8/2003 | Ikai et al. |
| 6,611,202 B2 | 8/2003 | Schofield et al. |
| 6,611,227 B1 | 8/2003 | Nebiyeloul-Kifle |
| 6,611,610 B1 | 8/2003 | Stam et al. |
| 6,611,759 B2 | 8/2003 | Brosche |
| 6,614,387 B1 | 9/2003 | Deadman |
| 6,614,579 B2 | 9/2003 | Roberts et al. |
| 6,616,764 B2 | 9/2003 | Kramer et al. |
| 6,617,564 B2 | 9/2003 | Ockerse et al. |
| 6,618,672 B2 | 9/2003 | Sasaki et al. |
| 6,630,888 B2 | 10/2003 | Lang et al. |
| 6,631,316 B2 | 10/2003 | Stam et al. |
| 6,635,194 B2 | 10/2003 | Kloeppner |
| 6,636,258 B2 | 10/2003 | Strumolo |
| 6,642,840 B2 | 11/2003 | Lang et al. |
| 6,642,851 B2 | 11/2003 | Deline et al. |
| 6,648,477 B2 | 11/2003 | Hutzel et al. |
| 6,650,457 B2 | 11/2003 | Busscher et al. |
| 6,657,767 B2 | 12/2003 | Bonardi |
| 6,665,592 B2 | 12/2003 | Kodama |
| 6,670,207 B1 | 12/2003 | Roberts |
| 6,670,910 B2 | 12/2003 | Delcheccolo et al. |
| 6,674,370 B2 | 1/2004 | Rodewald et al. |
| 6,675,075 B1 | 1/2004 | Engelsberg et al. |
| 6,677,986 B1 | 1/2004 | Pöchmüller |
| 6,683,539 B2 | 1/2004 | Trajkovic et al. |

(56) References Cited

U.S. PATENT DOCUMENTS

| | | |
|---|---|---|
| 6,683,969 B1 | 1/2004 | Nishigaki et al. |
| 6,690,268 B2 | 2/2004 | Schofield et al. |
| 6,690,413 B1 | 2/2004 | Moore |
| 6,693,517 B2 | 2/2004 | McCarty et al. |
| 6,693,518 B2 | 2/2004 | Kumata |
| 6,693,519 B2 | 2/2004 | Keirstead |
| 6,693,524 B1 | 2/2004 | Payne |
| 6,700,692 B2 | 3/2004 | Tonar |
| 6,717,610 B1 | 4/2004 | Bos et al. |
| 6,727,808 B1 | 4/2004 | Uselmann et al. |
| 6,727,844 B1 | 4/2004 | Zimmermann et al. |
| 6,731,332 B1 | 5/2004 | Yasui et al. |
| 6,734,807 B2 | 5/2004 | King |
| 6,737,964 B2 | 5/2004 | Samman et al. |
| 6,738,088 B1 | 5/2004 | Uskolovsky et al. |
| 6,744,353 B2 | 6/2004 | Sjonell |
| 6,746,122 B2 | 6/2004 | Knox |
| D493,131 S | 7/2004 | Lawlor et al. |
| D493,394 S | 7/2004 | Lawlor et al. |
| 6,768,566 B2 | 7/2004 | Walker |
| 6,772,057 B2 | 8/2004 | Breed et al. |
| 6,774,988 B2 | 8/2004 | Stam et al. |
| 6,781,738 B2 | 8/2004 | Kikuchi et al. |
| 6,816,145 B1 | 11/2004 | Evanicky |
| 6,816,297 B1 | 11/2004 | Tonar |
| D499,678 S | 12/2004 | Bradley |
| 6,846,098 B2 | 1/2005 | Bourdelais et al. |
| 6,847,487 B2 | 1/2005 | Burgner |
| 6,853,413 B2 | 2/2005 | Larson |
| 6,861,809 B2 | 3/2005 | Stam |
| 6,870,656 B2 | 3/2005 | Tonar et al. |
| 6,902,284 B2 | 6/2005 | Hutzel et al. |
| 6,902,307 B2 | 6/2005 | Strazzanti |
| 6,906,632 B2 | 6/2005 | DeLine et al. |
| 6,912,001 B2 | 6/2005 | Okamoto et al. |
| 6,913,375 B2 | 7/2005 | Strazzanti |
| 6,923,080 B1 | 8/2005 | Dobler et al. |
| 6,924,919 B2 | 8/2005 | Hunia et al. |
| 6,930,737 B2 | 8/2005 | Weindorf et al. |
| 6,934,080 B2 | 8/2005 | Saccomanno et al. |
| 6,946,978 B2 | 9/2005 | Schofield |
| 6,968,273 B2 | 11/2005 | Ockerse |
| 7,012,543 B2 | 3/2006 | DeLine et al. |
| 7,038,577 B2 | 5/2006 | Pawlicki et al. |
| 7,042,616 B2 | 5/2006 | Tonar et al. |
| 7,046,448 B2 | 5/2006 | Burgner |
| 7,064,882 B2 | 6/2006 | Tonar |
| 7,130,101 B2 | 10/2006 | Rukavina et al. |
| 7,175,291 B1 | 2/2007 | Li |
| 7,249,860 B2 | 7/2007 | Kulas et al. |
| 7,255,465 B2 | 8/2007 | DeLine et al. |
| 7,262,406 B2 | 8/2007 | Heslin et al. |
| 7,265,342 B2 | 9/2007 | Heslin et al. |
| D553,061 S | 10/2007 | Schmidt et al. |
| 7,285,903 B2 | 10/2007 | Cull et al. |
| 7,287,868 B2 | 10/2007 | Carter |
| 7,292,208 B1 | 11/2007 | Park et al. |
| 7,311,428 B2 | 12/2007 | DeLine et al. |
| 7,321,112 B2 | 1/2008 | Stam et al. |
| 7,324,261 B2 | 1/2008 | Tonar et al. |
| 7,329,013 B2 * | 2/2008 | Blank ................ B60R 1/12 359/838 |
| 7,342,707 B2 | 3/2008 | Roberts |
| 7,360,932 B2 | 4/2008 | Uken et al. |
| 7,417,221 B2 | 8/2008 | Creswick et al. |
| 7,417,717 B2 | 8/2008 | Pack |
| 7,446,650 B2 | 11/2008 | Scholfield et al. |
| 7,467,883 B2 | 12/2008 | DeLine et al. |
| 7,468,651 B2 | 12/2008 | DeLine et al. |
| 7,505,047 B2 | 3/2009 | Yoshimura |
| 7,510,287 B2 * | 3/2009 | Hook ................ B60R 1/04 248/481 |
| 7,533,998 B2 | 5/2009 | Schofield et al. |
| 7,548,291 B2 | 6/2009 | Lee et al. |
| 7,565,006 B2 | 7/2009 | Stam et al. |
| 7,567,291 B2 | 7/2009 | Bechtel et al. |
| 7,579,940 B2 | 8/2009 | Schofield et al. |
| 7,592,563 B2 | 9/2009 | Wissenbach |
| 7,619,508 B2 | 11/2009 | Lynam et al. |
| 7,653,215 B2 | 1/2010 | Stam |
| 7,658,521 B2 | 2/2010 | DeLine et al. |
| 7,663,798 B2 | 2/2010 | Tonar |
| 7,683,326 B2 | 3/2010 | Stam et al. |
| 7,688,495 B2 | 3/2010 | Tonar et al. |
| 7,706,046 B2 | 4/2010 | Bauer et al. |
| 7,711,479 B2 | 5/2010 | Taylor et al. |
| 7,719,408 B2 | 5/2010 | DeWard et al. |
| 7,720,580 B2 | 5/2010 | Higgins-Luthman |
| 7,746,534 B2 | 6/2010 | Tonar et al. |
| 7,815,326 B2 | 10/2010 | Blank et al. |
| 7,817,020 B2 | 10/2010 | Turnbull et al. |
| 7,821,696 B2 | 10/2010 | Tonar et al. |
| 7,830,583 B2 | 11/2010 | Neuman et al. |
| 7,864,399 B2 | 1/2011 | McCabe et al. |
| 7,877,175 B2 | 1/2011 | Higgins-Luthman |
| 7,881,496 B2 | 2/2011 | Camilleri et al. |
| 7,881,839 B2 | 2/2011 | Stam et al. |
| 7,888,629 B2 * | 2/2011 | Heslin ................ B60R 1/04 250/208.1 |
| 7,914,188 B2 | 3/2011 | DeLine et al. |
| 7,916,009 B2 * | 3/2011 | Schofield ............ B60C 23/0401 340/425.5 |
| 7,972,045 B2 | 7/2011 | Schofield |
| 7,978,393 B2 | 7/2011 | Tonar et al. |
| 7,994,471 B2 | 8/2011 | Heslin et al. |
| 8,031,225 B2 | 10/2011 | Watanabe et al. |
| 8,035,881 B2 | 10/2011 | Luten et al. |
| 8,045,760 B2 | 10/2011 | Stam et al. |
| 8,059,235 B2 | 11/2011 | Utsumi et al. |
| 8,063,753 B2 | 11/2011 | Deline et al. |
| 8,090,153 B2 | 1/2012 | Schofield et al. |
| 8,095,310 B2 | 1/2012 | Taylor et al. |
| 8,100,568 B2 | 1/2012 | Deline et al. |
| 8,116,929 B2 | 2/2012 | Higgins-Luthman |
| 8,120,652 B2 | 2/2012 | Bechtel et al. |
| 8,142,059 B2 | 3/2012 | Higgins-Luthman et al. |
| 8,162,518 B2 | 4/2012 | Schofield |
| 8,194,133 B2 | 6/2012 | DeWind et al. |
| 8,201,800 B2 | 6/2012 | Filipiak |
| 8,203,433 B2 | 6/2012 | Deuber et al. |
| 8,217,830 B2 | 7/2012 | Lynam |
| 8,222,588 B2 | 7/2012 | Schofield et al. |
| 8,237,909 B2 | 8/2012 | Ostreko et al. |
| 8,258,433 B2 | 9/2012 | Byers et al. |
| 8,282,226 B2 | 10/2012 | Blank et al. |
| 8,325,028 B2 | 12/2012 | Schofield et al. |
| 8,351,454 B2 * | 1/2013 | Jain ................ G06F 21/606 370/280 |
| 8,482,683 B2 | 7/2013 | Hwang et al. |
| 8,520,069 B2 | 8/2013 | Haler |
| 8,564,662 B2 | 10/2013 | Busch et al. |
| 8,658,283 B2 | 2/2014 | Shimatani |
| 8,779,910 B2 | 7/2014 | DeLine et al. |
| 9,041,806 B2 * | 5/2015 | Baur ................ B60R 1/00 340/903 |
| 9,057,875 B2 | 6/2015 | Fish, Jr. et al. |
| 9,475,431 B2 * | 10/2016 | Brummel ................ B60R 1/04 |
| 2001/0019356 A1 | 9/2001 | Takeda et al. |
| 2001/0022616 A1 | 9/2001 | Rademacher et al. |
| 2001/0026316 A1 | 10/2001 | Senatore |
| 2001/0045981 A1 | 11/2001 | Gloger et al. |
| 2002/0040962 A1 | 4/2002 | Schofield et al. |
| 2002/0044065 A1 | 4/2002 | Quist et al. |
| 2002/0047378 A1 * | 4/2002 | Bingle ................ B60R 1/072 310/89 |
| 2002/0159171 A1 * | 10/2002 | Schnell ................ B60R 1/025 359/877 |
| 2002/0191127 A1 | 12/2002 | Roberts et al. |
| 2003/0002165 A1 | 1/2003 | Mathias et al. |
| 2003/0007261 A1 | 1/2003 | Hutzel et al. |
| 2003/0016125 A1 | 1/2003 | Lang et al. |
| 2003/0016287 A1 | 1/2003 | Nakayama et al. |
| 2003/0025596 A1 | 2/2003 | Lang et al. |
| 2003/0025597 A1 | 2/2003 | Schofield |

(56) References Cited

U.S. PATENT DOCUMENTS

| | | |
|---|---|---|
| 2003/0030546 A1 | 2/2003 | Tseng |
| 2003/0030551 A1 | 2/2003 | Ho |
| 2003/0030724 A1 | 2/2003 | Okamoto |
| 2003/0035050 A1 | 2/2003 | Mizusawa |
| 2003/0043269 A1 | 3/2003 | Park |
| 2003/0052969 A1 | 3/2003 | Satoh et al. |
| 2003/0058338 A1 | 3/2003 | Kawauchi et al. |
| 2003/0067383 A1 | 4/2003 | Yang |
| 2003/0076415 A1 | 4/2003 | Strumolo |
| 2003/0080877 A1 | 5/2003 | Takagi et al. |
| 2003/0085806 A1 | 5/2003 | Samman et al. |
| 2003/0088361 A1 | 5/2003 | Sekiguchi |
| 2003/0090568 A1 | 5/2003 | Pico |
| 2003/0090569 A1 | 5/2003 | Poechmueller |
| 2003/0090570 A1 | 5/2003 | Takagi et al. |
| 2003/0098908 A1 | 5/2003 | Misaiji et al. |
| 2003/0103141 A1 | 6/2003 | Bechtel et al. |
| 2003/0103142 A1 | 6/2003 | Hitomi et al. |
| 2003/0117522 A1 | 6/2003 | Okada |
| 2003/0122929 A1 | 7/2003 | Minaudo et al. |
| 2003/0122930 A1 | 7/2003 | Schofield et al. |
| 2003/0133014 A1 | 7/2003 | Mendoza |
| 2003/0137586 A1 | 7/2003 | Lewellen |
| 2003/0141965 A1 | 7/2003 | Gunderson et al. |
| 2003/0146831 A1 | 8/2003 | Berberich et al. |
| 2003/0169158 A1 | 9/2003 | Paul, Jr. |
| 2003/0179293 A1 | 9/2003 | Oizumi |
| 2003/0202096 A1 | 10/2003 | Kim |
| 2003/0202357 A1 | 10/2003 | Strazzanti |
| 2003/0214576 A1 | 11/2003 | Koga |
| 2003/0214584 A1 | 11/2003 | Ross, Jr. |
| 2003/0214733 A1 | 11/2003 | Fujikawa et al. |
| 2003/0222793 A1 | 12/2003 | Tanaka et al. |
| 2003/0222983 A1 | 12/2003 | Nobori et al. |
| 2003/0227546 A1 | 12/2003 | Hilborn et al. |
| 2004/0004541 A1 | 1/2004 | Hong |
| 2004/0027695 A1 | 2/2004 | Lin |
| 2004/0032321 A1 | 2/2004 | McMahon et al. |
| 2004/0036768 A1 | 2/2004 | Green |
| 2004/0051634 A1 | 3/2004 | Schofield et al. |
| 2004/0056955 A1 | 3/2004 | Berberich et al. |
| 2004/0057131 A1 | 3/2004 | Hutzel et al. |
| 2004/0064241 A1 | 4/2004 | Sekiguchi |
| 2004/0066285 A1 | 4/2004 | Sekiguchi |
| 2004/0075603 A1 | 4/2004 | Kodama |
| 2004/0080404 A1 | 4/2004 | White |
| 2004/0080431 A1 | 4/2004 | White |
| 2004/0085196 A1 | 5/2004 | Milelr et al. |
| 2004/0090314 A1 | 5/2004 | Iwamoto |
| 2004/0090317 A1 | 5/2004 | Rothkop |
| 2004/0096082 A1 | 5/2004 | Nakai et al. |
| 2004/0098196 A1 | 5/2004 | Sekiguchi |
| 2004/0107030 A1 | 6/2004 | Nishira et al. |
| 2004/0107617 A1 | 6/2004 | Shoen et al. |
| 2004/0109060 A1 | 6/2004 | Ishii |
| 2004/0114039 A1 | 6/2004 | Ishikura |
| 2004/0119668 A1 | 6/2004 | Homma et al. |
| 2004/0125905 A1 | 7/2004 | Vlasenko et al. |
| 2004/0148102 A1* | 7/2004 | McCarthy ............ B60R 1/12 701/484 |
| 2004/0160660 A1 | 8/2004 | Malvino |
| 2004/0202001 A1 | 10/2004 | Roberts et al. |
| 2004/0263988 A1* | 12/2004 | Lin ............ A47G 1/02 359/630 |
| 2005/0063036 A1 | 3/2005 | Bechtel et al. |
| 2005/0140855 A1 | 6/2005 | Utsumi |
| 2005/0156753 A1 | 7/2005 | DeLine et al. |
| 2005/0200935 A1 | 9/2005 | Liu et al. |
| 2005/0237440 A1 | 10/2005 | Sugimura et al. |
| 2006/0007550 A1 | 1/2006 | Tonar et al. |
| 2006/0050018 A1* | 3/2006 | Hutzel ............ B60K 35/00 345/60 |
| 2006/0115759 A1 | 6/2006 | Kim et al. |
| 2006/0139953 A1 | 6/2006 | Chou et al. |
| 2006/0158899 A1 | 7/2006 | Ayabe et al. |
| 2007/0146481 A1 | 6/2007 | Chen et al. |
| 2007/0171037 A1 | 7/2007 | Schofield et al. |
| 2007/0279756 A1* | 12/2007 | Rosario ............ B60R 1/12 359/633 |
| 2008/0055757 A1* | 3/2008 | Uken ............ B60K 35/00 359/872 |
| 2008/0068520 A1 | 3/2008 | Minikey, Jr. et al. |
| 2008/0077882 A1* | 3/2008 | Kramer ............ B60K 35/00 715/810 |
| 2008/0192132 A1 | 8/2008 | Bechtel et al. |
| 2008/0225538 A1* | 9/2008 | Lynam ............ B60K 35/00 362/494 |
| 2008/0247192 A1 | 10/2008 | Hoshi et al. |
| 2008/0294315 A1 | 11/2008 | Breed |
| 2008/0302657 A1 | 12/2008 | Luten et al. |
| 2009/0015736 A1 | 1/2009 | Weller et al. |
| 2009/0040306 A1* | 2/2009 | Foote ............ B60Q 1/2665 348/148 |
| 2009/0141516 A1 | 6/2009 | Wu et al. |
| 2009/0296190 A1 | 12/2009 | Anderson et al. |
| 2010/0046104 A1* | 2/2010 | Rimac ............ B60R 1/025 359/843 |
| 2010/0110553 A1 | 5/2010 | Anderson et al. |
| 2010/0201816 A1 | 8/2010 | Lee et al. |
| 2010/0201896 A1 | 8/2010 | Ostreko et al. |
| 2010/0277786 A1 | 11/2010 | Anderson et al. |
| 2011/0168687 A1 | 7/2011 | Door |
| 2011/0176323 A1 | 7/2011 | Skiver et al. |
| 2011/0181727 A1 | 7/2011 | Weller et al. |
| 2011/0188122 A1* | 8/2011 | Habibi ............ B60R 1/08 359/604 |
| 2011/0299170 A1 | 12/2011 | Harlow et al. |
| 2012/0038964 A1 | 2/2012 | De Wind et al. |
| 2012/0069444 A1 | 3/2012 | Campbell et al. |
| 2012/0229882 A1 | 9/2012 | Fish, Jr. et al. |
| 2012/0236388 A1 | 9/2012 | De Wind et al. |
| 2013/0028473 A1 | 1/2013 | Hilldore et al. |
| 2013/0279014 A1 | 10/2013 | Fish, Jr. et al. |
| 2014/0022390 A1 | 1/2014 | Blank et al. |
| 2014/0043479 A1 | 2/2014 | Busch et al. |
| 2014/0192431 A1 | 7/2014 | Sloterbeek et al. |
| 2014/0347488 A1 | 11/2014 | Tazaki et al. |
| 2015/0098121 A1 | 4/2015 | Turnbull et al. |
| 2015/0103389 A1 | 4/2015 | Klawuhn et al. |
| 2015/0309383 A1 | 10/2015 | Taya et al. |

FOREIGN PATENT DOCUMENTS

| | | |
|---|---|---|
| EP | 0684155 B1 | 7/1997 |
| EP | WO 98/57228 | 12/1998 |
| EP | 0899157 A1 | 3/1999 |
| EP | 0947874 A2 | 10/1999 |
| EP | 0947875 A2 | 10/1999 |
| EP | 0947876 A2 | 10/1999 |
| EP | 0975488 B1 | 10/2002 |
| EP | 0899157 B1 | 10/2004 |
| GB | 2338363 | 12/1999 |
| JP | 1178693 | 3/1999 |
| JP | 2002096685 A | 4/2002 |
| JP | 2002200936 A | 7/2002 |
| JP | 2005148119 | 6/2005 |
| JP | 2005327600 | 11/2005 |
| JP | 2008139819 A | 6/2008 |
| JP | 2009542505 A | 12/2009 |
| JP | 2013244753 A | 12/2013 |
| WO | 9621581 | 7/1996 |
| WO | 2007103573 A2 | 9/2007 |
| WO | 2010090964 | 8/2010 |

OTHER PUBLICATIONS

Adler, "A New Automotive AMLCD Module," Proceedings of the Vehicle Display Symposium, Nov. 2, 1995, pp. 67-71, Society for Information Display, Detroit Chapter, Santa Ana, CA.

Sayer, et al., "In-Vehicle Displays for Crash Avoidance and Navigation Systems," Proceedings of the Vehicle Display Symposium,

(56) References Cited

OTHER PUBLICATIONS

Sep. 18, 1996, pp. 39-42, Society for Information Display, Detroit Chapter, Santa Ana, CA.
Knoll, et al., "Application of Graphic Displays in Automobiles," SID 87 Digest, 1987, pp. 41-44, 5A.2.
Terada, et al., "Development of Central Information Display of Automotive Application," SID 89 Digest, 1989, pp. 192-195, Society for Information Display, Detroit Center, Santa Ana, CA.
Thomsen, et al., "AMLCD Design Considerations for Avionics and Vetronics Applications," Proceedings of the 5th Annual Flat Panel Display Strategic and Technical Symposium, Sep. 9-10, 1998, pp. 139-145, Society for Information Display, Metropolitan Detroit Chapter, CA.
Knoll, et al., "Conception of an Integrated Driver Information System," SID International Symposium Digest of Technical Papers, 1990, pp. 126-129, Society for Information Display, Detroit Center, Santa Ana, CA.
Vincen, "An Analysis of Direct-View FPDs for Automotive Multi-Media Applications," Proceedings of the 6th Annual Strategic and Technical Symposium "Vehicular Applications of Displays and Microsensors," Sep. 22-23, 1999, pp. 39-46, Society for Information Display, Metropolitan Detroit Chapter, San Jose, CA.
Zuk, et al., "Flat Panel Display Applications in Agriculture Equipment," Proceedings of the 5th Annual Flat Panel Display Strategic and Technical Symposium, Sep. 9-10, 1998, pp. 125-130, Society for Information Display, Metropolitan Detroit Chapter, CA.
Vijan, et al., "A 1.7-Mpixel Full-Color Diode Driven AM-LCD," SID International Symposium, 1990, pp. 530-533, Society for Information Display, Playa del Rey, CA.
Vincen, "The Automotive Challenge to Active Matrix LCD Technology," Proceedings of the Vehicle Display Symposium, 1996, pp. 17-21, Society for Information Display, Detroit Center, Santa Ana, CA.
Corsi, et al., "Reconfigurable Displays Used as Primary Automotive Instrumentation," SAE Technical Paper Series, 1989, pp. 13-18, Society of Automotive Engineers, Inc., Warrendale, PA.
Schumacher, "Automotive Display Trends," SID 96 Digest, 1997, pp. 1-6, Delco Electronics Corp., Kokomo, IN.
Knoll, "The Use of Displays in Automotive Applications," Journal of the SID 5/3 1997, pp. 165-172, 315-316, Stuttgart, Germany.
Donofrio, "Looking Beyond the Dashboard," SID 2002, pp. 30-34, Ann Arbor, MI.
Stone, "Automotive Display Specification," Proceedings of the Vehicle Display Symposium, 1995, pp. 93-96, Society for Information Display, Detroit Center, Santa Ana, CA.
R. Sullivan et al., "Effect of Switching Control Strategies on the Energy Performance of Electrochromic Windows," SPIE, vol. 2255, 14 pages, (Feb. 1994).
A.W. Czanderna et al., "Durability Issues and Service Lifetime Prediction of Electrochromic Windows for Buildings Applications," Solar Energy Materials & Solar Cells, 56 (1999), 18 pages.
Patent Cooperation Treaty Communication, mailed Dec. 21, 2007, 13 pages.
Communication from the European Patent Office, Supplementary European Search Report, Mailed Aug. 8, 2010, (9 pages).
International Search Report and Written Opinion of the International Searching Authority, or the Declaration dated Feb. 4, 2016 for International Application No. PCT/US2015059461, 8 pages.

* cited by examiner

FULL DISPLAY MIRROR ACTUATOR

CROSS REFERENCE TO RELATED APPLICATION

This application claims benefit to provisional application No. 62/076,542 filed on Nov. 7, 2014, entitled "FULL DISPLAY MIRROR ACTUATOR," the disclosure of which is hereby incorporated herein by reference in its entirety.

TECHNOLOGICAL FIELD

The present disclosure relates generally to a full-display rearview mirror for a motor vehicle and more particularly, relates to a mechanism for automatic movement of the display mirror substrate between active and inactive positions.

BACKGROUND

Automotive rearview mirrors including video displays therein may be referred to as full-display mirrors. Such mirrors are currently required to include functionality as an ordinary, reflective rearview mirror that can be implemented as an alternative to the included video display, which can be done, for example, in response to a loss of power to the video display or the like. Incorporation of such functionality has been accomplished by including a reflective surface over the video display that is at least partially transparent such that the display is visible therethrough. To prevent the reflected image from interfering with the video image, when available, the mirror may be tilted upward, toward the vehicle headliner, such that the reflective image is less noticeable to the driver and. Such tilting has been implemented, for example, by use of a bi-modal lever that the driver can use to manually move the mirror between the upwardly-tilted position associated with video display use and a position whereby the reflective surface can be used in connection with the rearview mirror. Such mechanisms require manual input by the user and may give an undesirable appearance of an ordinary prism-mirror. Accordingly, further advances may be desired.

SUMMARY

According to one aspect of the present disclosure, a rearview mirror for a vehicle includes a housing defining an interior cavity and an open side, a substrate extending within the open side of the housing and having a reflective surface thereon, and an actuation mechanism moveably coupling the substrate with the housing. The actuation mechanism includes a mounting plate rotatably coupled within the cavity of the housing at a first end of the mounting plate. The mounting plate defines a socket open opposite the first end and first and second scalloped surfaces adjacent the socket. The actuation mechanism further includes an actuation wheel coupled within the cavity of the housing opposite the first end of the mounting plate and rotatable about an axis. The actuation wheel has a pin engageable with the socket to cause rotation of the mounting plate between a first position and a second position and a cam alternately engageable with the first scalloped surface to secure the mounting plate in the first position and with the second scalloped surface to secure the mounting plate in the second position.

According to another aspect of the present disclosure, a rear-vision system for a vehicle includes a video camera mounted on the vehicle in a position to capture an image of a portion of an exterior thereof and a display mirror assembly. The display mirror assembly includes a substrate having a display in electronic communication with the camera for presenting the image thereon with a one-way reflective layer overlying the display. The mirror assembly further includes a mounting plate defining a socket open opposite the first end and a first scalloped surface adjacent the socket, a mounting structure coupled between the mounting plate and a portion of the vehicle, and a housing supporting the display and defining an internal cavity and being rotatably coupled with a first end of the mounting plate within in the cavity. An actuation wheel is coupled within the cavity of the housing and is rotatable about an axis. The actuation wheel includes a pin and a peripheral surface alternately respectively engageable with the socket and the first scalloped surface through a rotational motion of the actuation wheel.

According to yet another aspect of the present disclosure, a vehicle includes a windshield, a headliner adjacent an upper edge of the windshield, and a mirror assembly. The mirror assembly includes a substrate having a display and a one-way reflective layer overlying the display, a mounting plate defining a socket open opposite the first end and a first scalloped surface adjacent the socket, a mounting structure coupled with the mounting plate and coupling with the vehicle adjacent the upper edge of the windshield, and a housing supporting the display and defining an internal cavity and being rotatably coupled with a first end of the mounting plate within in the cavity. An actuation wheel is coupled within the cavity of the housing and is rotatable about an axis. The actuation wheel includes a pin and a peripheral surface alternately respectively engageable with the socket and the first scalloped surface through a rotational motion of the actuation wheel that moves the housing relative to the mounting plate between a first position and a second position.

These and other features, advantages, and objects of the present device will be further understood and appreciated by those skilled in the art upon studying the following specification, claims, and appended drawings.

DETAILED DESCRIPTION OF EMBODIMENTS

Figure 1A:
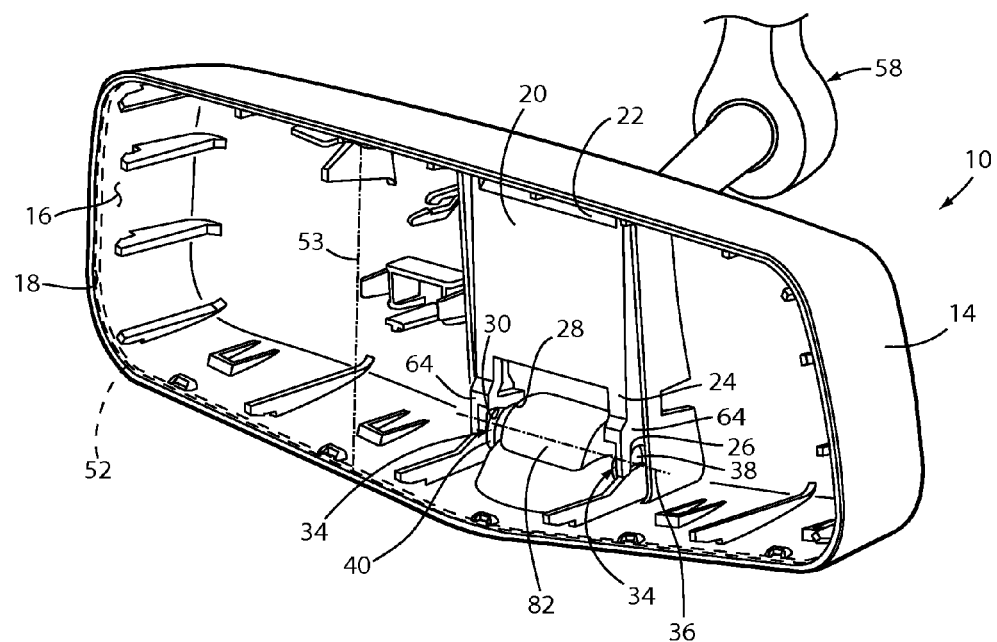
FIG. 1A is a front perspective view of a rearview mirror assembly including an actuation mechanism for tilting a display substrate included therewith.

For purposes of description herein the terms "upper," "lower," "right," "left," "rear," "front," "vertical," "horizontal," and derivatives thereof shall relate to the device as oriented in FIG. 1A. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
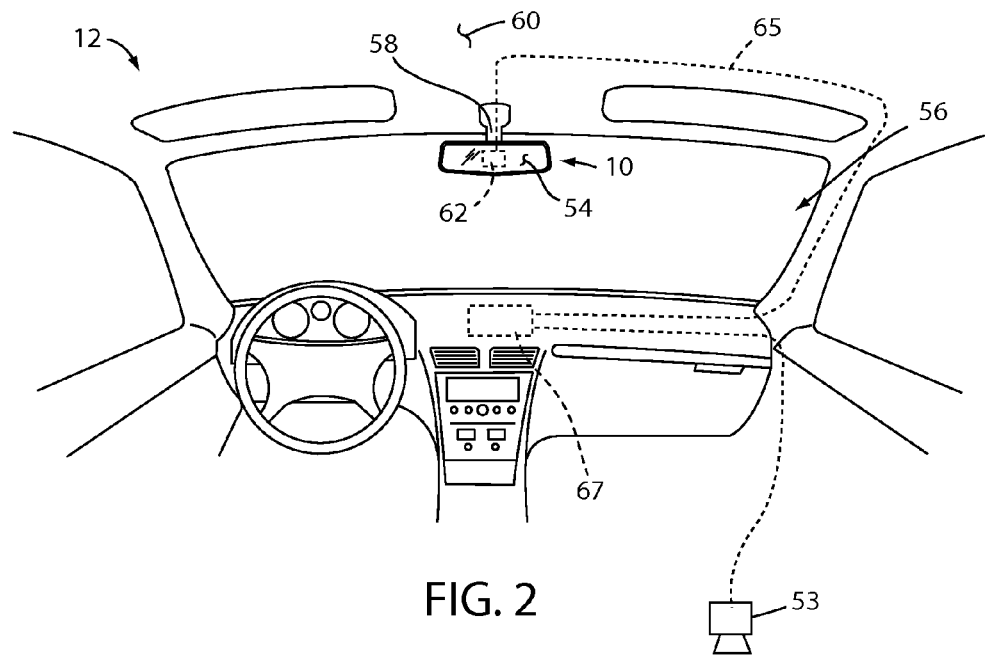
FIG. 2 is a perspective view of a portion of a vehicle interior including the rearview mirror of FIG. 1A.

Referring now to FIG. 1A, reference numeral 10 generally designates a rearview mirror for a vehicle 12 (of which the interior thereof is shown in FIG. 2). Rearview mirror 10 includes a housing 14 defining an interior cavity 16 and an open side 18 to the cavity 16. A mounting plate 20 having a first end 22 and a second end 24 opposite the first end 22 is rotatably coupled at the first end 22 thereof with housing 14 within cavity 16. Adjacent to second end 24, mounting plate 20 defines a socket 26 open on a portion of mounting plate 20 and extending toward first end 22. Mounting plate 20 further defines a first scalloped surface 28 and a second scalloped surface 30. The first and second scalloped surfaces 28 and 30 are positioned on opposite of an apex 32 formed at an intersection between first and second scalloped surfaces 28 and 30.

Rearview mirror 10 further includes an actuation wheel 34 rotatably coupled within cavity 16 of housing 14 on an axis 36. The actuation wheel 34 includes a pin 38 spaced apart from axis 36. Wheel 34 is positioned such that that rotation thereof moves pin 38 into an out of engagement with socket 26 to cause a rotation of mounting plate about first end 22 between a first position and a second position. Actuation wheel 34 further includes a cam 40 coupled with pin 38. As further shown in FIG. 4, cam 40 defines a peripheral surface 41 that includes a first engagement portion 42 and a second engagement portion 44 and a bypass portion 46 between the first and second engagement portions 42 and 44. Cam 40 is shaped such that first and second engagement portions 42 and 44 are respectively moveable into engagement with the first scalloped surface 28 when the mounting plate is in the first position (see FIG. 4) and the second scalloped surface 30 when the mounting plate is in the second position (see FIG. 11). Cam 40 is further shaped such that bypass portion 46 generally aligns with apex 32 and is spaced apart therefrom at a point during the rotation of mounting plate 20 (see FIG. 9). Rearview mirror 10 further includes a substrate 52 having a reflective surface 54 thereon, substrate 52 being coupled with mounting plate 20 and extending within the open side 18 of housing 14.

As shown in FIG. 2, rearview mirror 10 can be used in connection with a vehicle interior 56, as shown in FIG. 2, including as a portion of a rearview vision system. In one embodiment substrate 52 can include a video display screen along a portion or an entirety thereof such that rearview mirror is what may be referred to as a full-display mirror. A substrate 52 including such a display is referred to herein as "display substrate" 52 and may be capable of displaying an image replicating that which would be available from a typical reflective mirror by receiving an image from an appropriately-positioned video camera 53 or the like when the display is in an "active" state shown, for example, in FIG. 3. Such an image can be supplemented with other information presented on display substrate 52. In combination with such a display substrate 52, mirror surface 54 may be applied thereover as a coating or separate element having properties of a one-way mirror to both provide a reflected image as well as to permit a video image of display substrate 52 to be visible therethrough. As further illustrated in FIG. 2, rearview mirror 10 can be electronically connected with camera 53 by electronic circuitry 63 within vehicle 12. Further, control circuitry 65 can be provided to both cause display substrate 52 to display the image from camera 53 and to implement corresponding movement of substrate 52 by way of control of the actuation mechanism described in further detail herein. Control circuitry 65 can further be connected with an on-board computer 67 to, for example, receive information regarding a state of the vehicle 12, for use by control circuitry 65, as discussed further below.

In connection with such an arrangement, the above-described internal components of rearview mirror 10, including mounting plate 20 and actuation wheel 34 can move substrate 52 within and with respect to housing 14 by rotation of mounting plate 20 about first end 22 thereof. Such movement can be useful to position substrate 52 according to whether or not display substrate 52 is in an off state or an on state. When display substrate 52 is in an inactive state, as depicted in FIG. 1A, reflective surface 54 may be intended to be used and/or positioned to allow rearview mirror 10 to act as a typical rearview mirror, meaning that substrate 52 is intended to be positioned such that an image to the rear of vehicle 12 is reflected toward the driver of vehicle 12.

When in the above-described active state, however, the presence of the reflective surface 54 over display substrate 52 can cause the image reflected by reflective surface 54 to compete with an image presented on display substrate 52. To alleviate such image competition, substrate 52 can be moved such that reflective surface 54 reflects an image of the headliner 60 toward the driver. Because vehicle headliners are of generally consistent, non-reflective material, such an image may compete less with the video image of display substrate 52. Accordingly, rearview mirror 10, by way of the actuation mechanism, including mounting plate 20 and actuation wheel 34, can provide for automatic repositioning of display substrate 52 between an appropriate position thereof for use of reflective surface 54 when display substrate 52 is in the inactive state and for viewing of a displayed image, without undesirable competition, when display substrate 52 is in an active state.

Figure 1B:
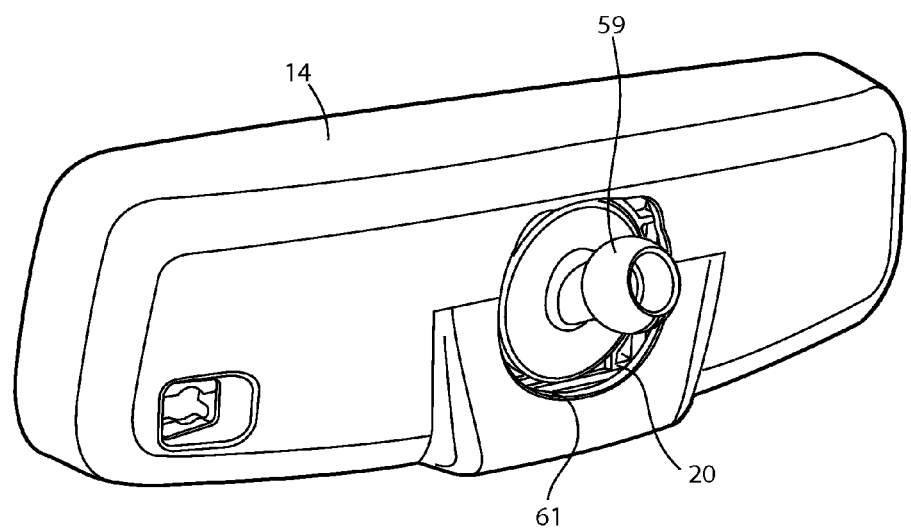
FIG. 1B is a rear perspective view of the rearview mirror assembly of FIG. 1A.

As shown in FIG. 1, when display substrate 52 is inactive, rearview mirror can be configured such that display substrate 52 is in a first position, as indicated by line 55. When display substrate 52 is oriented as such, the exact orientation of the first position can be adjusted by a user for use of reflective surface 54 when display substrate 52 is inactive by movement of housing 14 (to which substrate 52 is fixed) about a mounting structure 58, in a manner similar to that which is used for conventional rearview mirrors. Mounting structure 58 may be coupled with mounting plate 20 with mounting plate 20 being moveable within and with respect to housing 14. In this manner, mounting plate 20 may remain stationary with respect to mounting structure 58 (outside of such adjustment) during repositioning of display substrate 22 by the actuation mechanism, which serves to move housing, and thus substrate 52, with respect to mounting plate 20 and, thus, with respect to mounting structure 58, as described further below.

Figure 3:
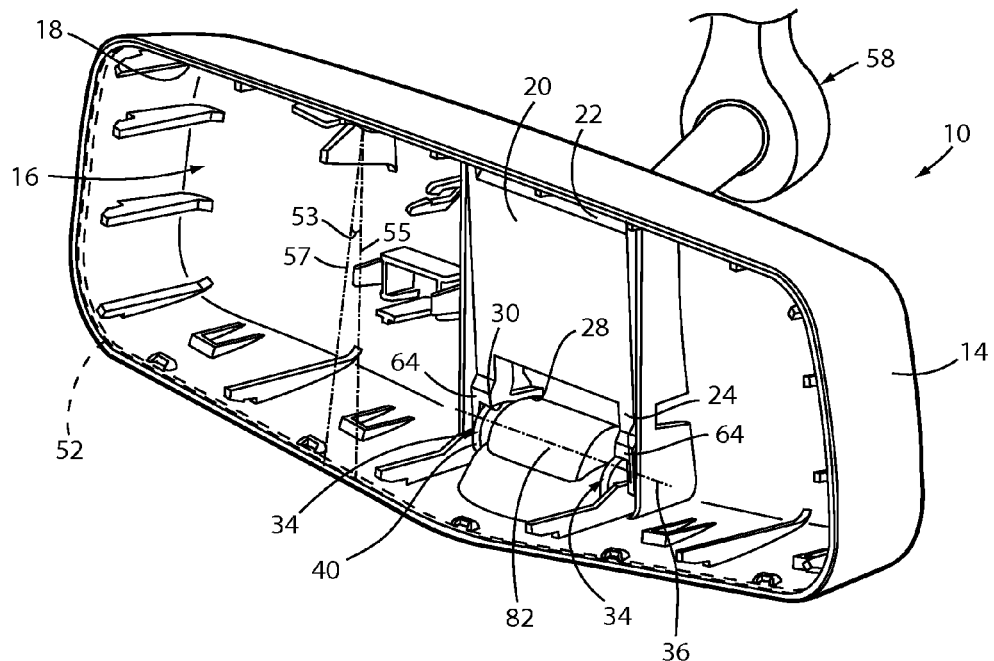
FIG. 3 is a front perspective view of the rearview mirror of FIG. 1A with the actuation mechanism in an additional configuration provided thereby.

Upon activation of the display substrate 52, rearview mirror 10, as described further below, can cause display substrate 52, along with housing 14, to tilt upward with respect to mounting plate 20, thereby orienting reflective surface 54 toward headliner 60, as shown in FIG. 3. Such orientation can be achieved by tilting of housing 14 with respect to mounting plate 20 about first end 22 of mounting plate 20 through an angle of between about 5° and about 10° and, in one embodiment, about 6°, although such an angle can vary based on the location and structure of rearview mirror 10. Such rotation results in substrate 52 rotating into the second position, indicated by line 57, illustrated in FIG. 3, which is positioned at an angle 78 with respect to the first position line 55 corresponding to the rotation of housing 14 with respect to mounting plate 20 (e.g. about 6°). Upon deactivation of display substrate 52, rearview mirror 10 can return display substrate 52 to the orientation shown in FIG. 1.

The movement of display substrate 52 by rearview mirror 10 can be achieved by rotation of actuation wheel 34 to move mounting plate 20 by operative engagement of pin 38 with socket 26. Rotation of actuation wheel 34 can be implemented automatically upon a change in the state (from active to inactive or vice versa) of display substrate 52. In an example, actuation wheel 34 can be automatically rotated to cause movement of display substrate 52 from the active state (shown in FIG. 3) to the inactive state (shown in FIG. 1) upon a detected malfunction of display substrate 52 or powering down of vehicle 12. By the use of actuation wheel 34 to move housing 14 with respect to mounting plate 20 to achieve such positioning of substrate 52, housing 14 can be left in the selected position for off-state usage of rearview mirror 10, meaning that upon deactivation of display substrate 52, resulting in a return of substrate 52 to the position shown in FIG. 1, rearview mirror 10 may be in a generally acceptable position for inactive state usage thereof.

As described above, movement of substrate 52 can be achieved by the above-described configuration and mutual positioning of actuation wheel 34 and mounting plate 20. For clarity with respect to FIGS. 4-11, rotational movement of actuation wheel 34 about axis 36 is described as moving second end 24 of mounting plate 20 in a generally outward or inward direction with respect to housing 14, thereby rotating mounting plate 20 with respect to housing. As discussed above, when positioned within vehicle 12, mounting plate is stationary, meaning that such relative movement of mounting plate 20 with respect to housing 14, such as in the progression shown in FIGS. 4-11, is understood as implementing movement of housing 14, which relates to movement of substrate 52 between the first position 55 (FIG. 1A) and the second position 57 (FIG. 3).

Returning now to FIG. 1A, housing 14 is shown in the form of a single-piece structure, which can be made to generally replicate the appearance of a standard rearview mirror, and can further be made from a single piece of injection molded plastic or the like, although other materials are possible. Housing 14 is structured so that interior cavity 16 is of a sufficient depth to retain internal structures thereof, including actuation wheel 34 and other related structures, as well as control circuitry for display substrate 52. Housing 14 is also structured such that open side 18 is sufficiently large to accept substrate 52 therein in a manner that again can generally replicate the appearance of a typical rearview mirror.

Mounting plate 20, as described above, is rotatably coupled with housing 14 at first end 22 thereof. Such coupling can be achieved by the incorporation of a hinge into respective portions of housing 14 and first end 22 of mounting plate 20 or by the coupling of a separate hinge (not shown) between mounting plate 20 and housing 14. As further shown in FIG. 1A, mounting plate 20 can generally extend through a majority of a vertical height of housing 14 and can further be of a width sufficient to stably couple with mounting structure 58, including by connection with a ball joint portion 59 that extends from mounting plate 20 through hole 61 in a corresponding portion of housing 14. Mounting plate 20 can, in turn, be moveably coupled with housing 14 about a hinge or the like on first end 22 thereof with substrate 52 supported on housing 14.

Figure 4:
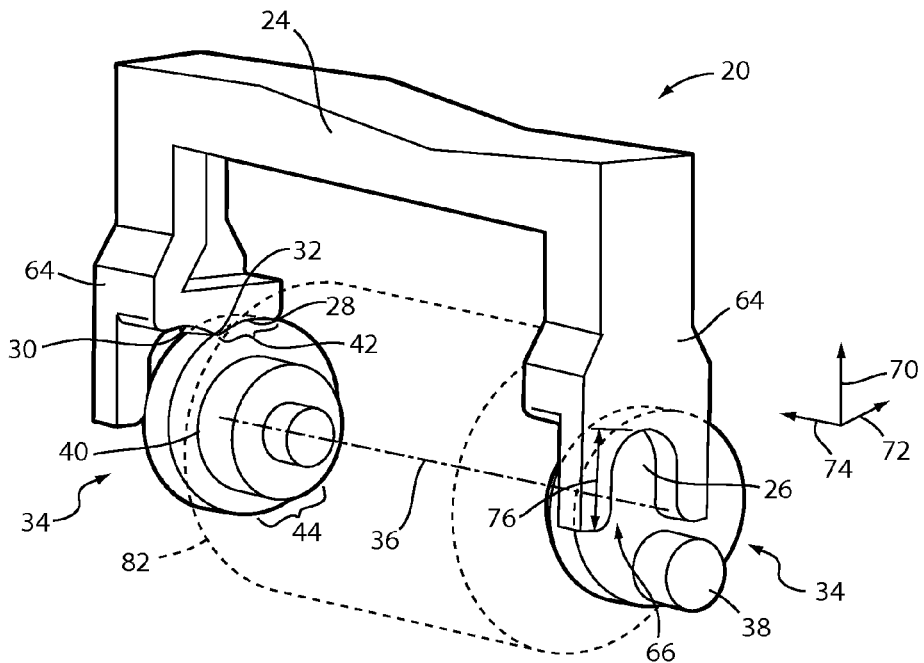
FIG. 4 is a front perspective view of a portion of the actuation mechanism in a configuration corresponding to an active position of the rearview mirror of FIG. 1A.
Figure 5:
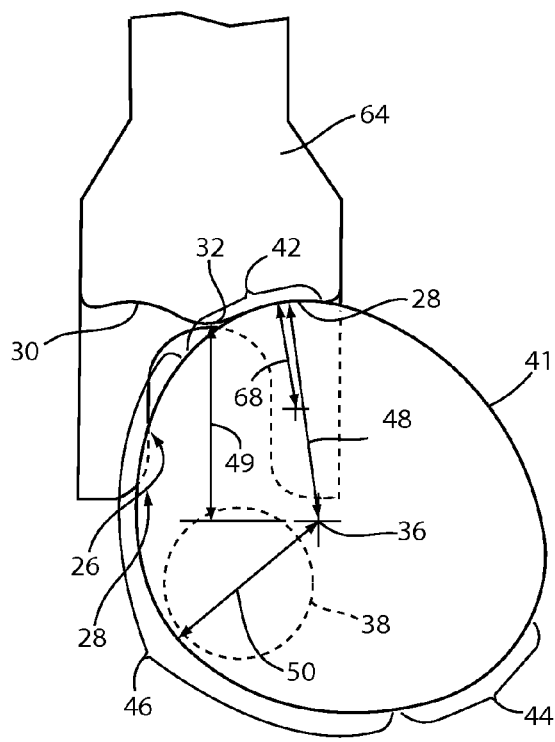
FIG. 5 is a schematic view of portions of the actuation mechanism of FIG. 4.

Turning now to FIGS. 4 and 5, mounting plate 20 is shown as having an extension arm 64, of which two are shown in the Figures, extending from second end 24 thereof. As shown in FIG. 4, extension arms 64 are positioned on opposite lateral sides of mounting plate 20 such that actuation wheels 34, of which two are also shown in the Figures, are positioned therebetween. The use of two extension arms 64 in connection with two corresponding actuation wheels 34 may help lead to a generally more stable arrangement during movement of substrate 52 between positions, as well as when retained in the inactive position shown in FIG. 1A and the active position shown in FIG. 3, however a single extension arm 64 and a single actuation wheel 34 may be used. Each of the illustrated extension arms 64 includes a respective socket 26, as described previously, as shown in FIG. 4, sockets 26 include openings 66 on respective ends of corresponding extension arms 64 and are at least somewhat elongated in the direction toward first end 22 of mounting plate 20. Sockets 26 may further be flared slightly in the area of opening 66 to provide for increased reliability with respect to the engagement of pin 38.

As further shown in FIG. 4 extension arms 64 also include the aforementioned first scalloped surface 28 and second scalloped surface 30 each of which are positioned vertically above respective sockets 26. As shown, first scalloped surface 28 and second scalloped surface 30 are generally mirror images of one another, each defining a scalloped radius 68 such that first scalloped surface 28 and second scalloped surface 30 each extend along a generally articulate path away from apex 32 which is positioned therebetween. As mentioned previously, apex 32 generally aligns with socket 26. As further shown in FIG. 4 first and second scalloped surfaces 28 and 30 extend generally inward along the respective extension arms 64 so as to define arcuate surfaces.

As further shown in FIG. 4 actuation wheels 34 can serve to both move mounting plate 20 between the active state of FIG. 1A and the inactive state of FIG. 3, as well as to securely maintain mounting plate 20 in such positions. Such movement and retention of mounting plate 20 is shown in FIGS. 4-11, in which FIG. 4 shows mounting plate 20 in a locking phase with actuation wheels 34 positioned so as to maintain mounting plate, and accordingly substrate 52 in the inactive position (FIG. 3). As depicted in FIGS. 4 and 5, when in such a locking state, actuation wheels 34 are oriented with respect to extension arms 64 such that the respective pins 38 are disengaged from corresponding sockets 26. In such position pins 38 are out of alignment with sockets 26 in both the vertical direction 70, as well as the longitudinal horizontal direction 72. As further shown, when in such a locking position, wheel 34 is positioned such that first engagement portion 42 of cam 40 is engaged with first scalloped surface 28. As shown, first engagement portion 42 may be shaped so as to generally match the shape of scalloped surface 28, including being configured with the same radius 68 as scalloped surface 28. In this manner, first scalloped surface 28 may generally encapsulate at least a portion of first engagement portion 42 such that mounting plate 20 is generally retained in its position with respect to actuation wheel 34, thereby restricting movement thereof.

By structuring cam 40 such that first engagement portion 42 is generally positioned, at least along the portion thereof at engagement distance 48 which is greater than height 49 of apex 32 above the axis 36 of wheel 34 (or a minimum distance between apex 32 and axis 36 throughout the range of motion of plate 20), encapsulation of first engagement portion 42 by scalloped surface 28 can be achieved.

Further, cam 40 can be of a generally compressible polymeric material such as various elastomeric materials or the like and can further be oversized relative to the positioning shown in FIGS. 2 and 5, such that when actuation wheel 34 is positioned according to FIGS. 4 and 5, it is compressed at least slightly against first scalloped surface 28, resulting in pressure between cam 40 and first scalloped surface 28. Such a configuration can further stabilize mounting plate 20 when in such a locked state. As such, cam 40 can be configured such that the first and second engagement portions 42 and 44 include the portions of cam 40 that extend from axis 38 at a maximum distance. The frictional force generated between cam 40, against first scalloped surface 28 or second scalloped surface 30 can be sufficient to maintain the engagement between first engagement portion 42 and first scalloped surface 28 (or second engagement portion 44 and second scalloped surface 30 as described further below), including under vibration of rearview mirror 10.

Figure 6:
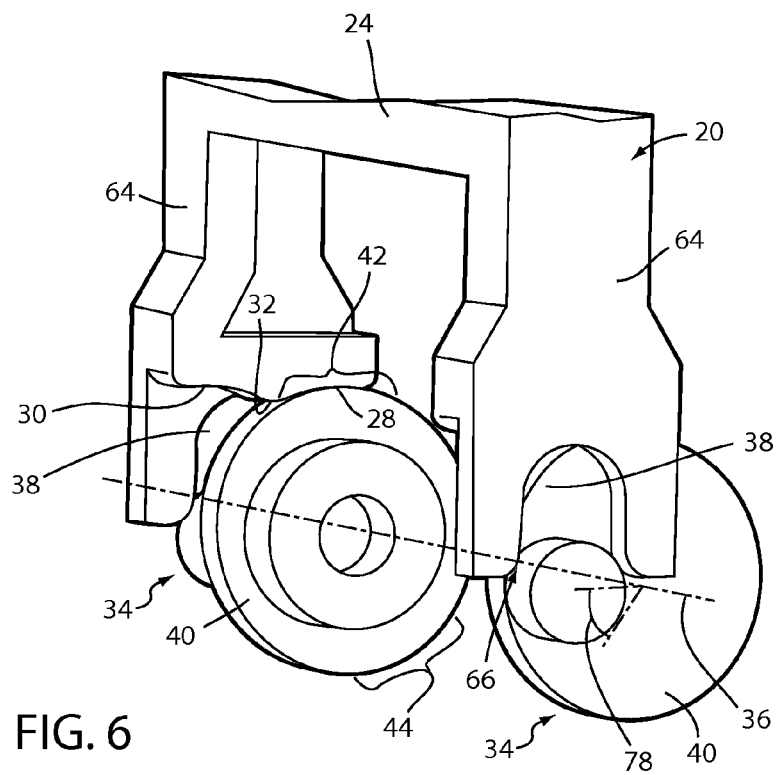
FIGS. 6-10 are front perspective views of a portion of the actuation mechanism at successive stages during a movement away from the configuration of FIG. 4.
Figure 7:
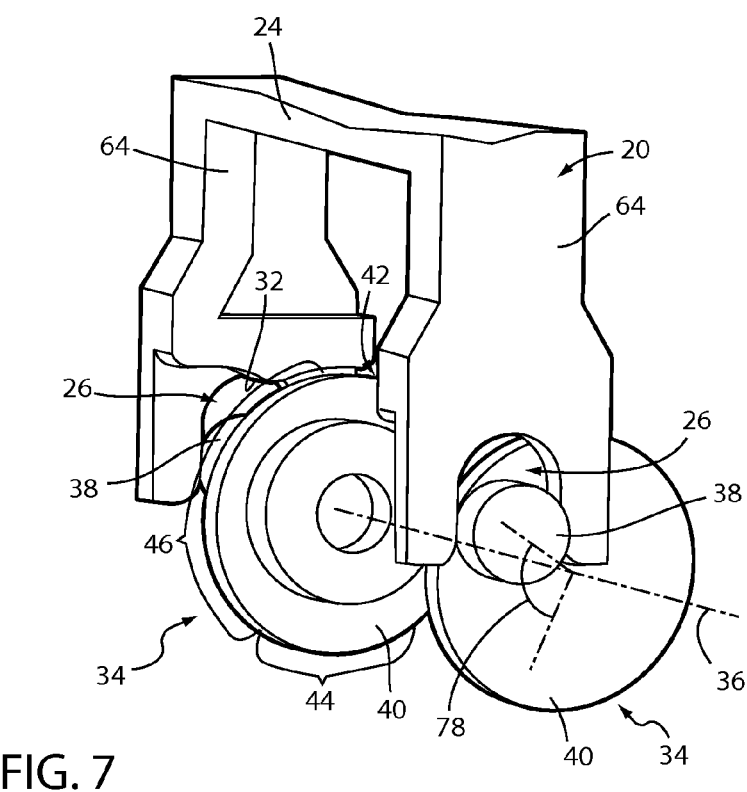

A shown in FIG. 6, as wheel 34 is rotated through an angle 78 of approximately 45 degrees, pin 38 moves into longitudinal horizontal alignment with socket 26, and begins to engage therewith in vertical direction 70. Due to the compression of cam 40 when in the locked state of FIGS. 4 and 5, rotation of wheel 34 through angle 78 of approximately 45 degrees is such that first engagement portion 42 remains generally in contact with first scalloped surface 28. Accordingly, while wheel 34 has begun rotation, mounting plate 20 is still generally maintained in the inactive position. As shown in FIG. 7, continued rotation of wheel 34 will initiate a movement phase when that angle 78 is approximately 100 degrees, which causes disengagement of first engagement portion 42 from first scalloped surface 28 such that cam 40 no longer acts to retain mounting plate 20 in any particular position. However, in such a position of wheel 34, pin 38 is generally fully engaged with socket 26 such that the position of mounting plate 20 is generally dictated by the rotational position of wheel 34 (i.e. second end 24 of mounting plate 20 is generally locked into position with respect to wheel 34).

Figure 8:
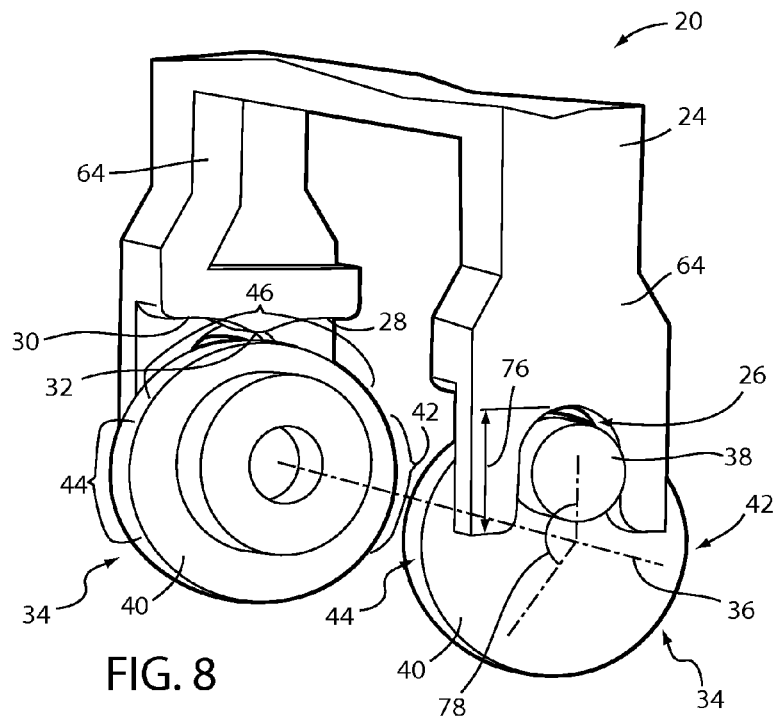

Continuing to FIG. 8, wheel 34 is shown as having moved through an angle of rotation 78 of approximately 135 degrees. As illustrated, such rotation of wheel 34 is such that mounting plate 20 is at a general midpoint of its rotation between the inactive position shown in FIG. 1A and the active position shown in FIG. 3. Such positioning of mounting plate can correspond to a rotation of approximately 3 degrees from its position in the active position. As further illustrated, socket 26 can be configured with a height 76 that permits movement of pin 38 that includes rotation about axis 36, including along a vertical component of such rotation. Accordingly, such movement of pin 38 can cause rotation of mounting plate 20 by the horizontal component of its rotational movement. Further, the positioning of wheel 34 is such that bypass portion 46 is generally aligned with apex 32 with bypass portion 46 is positioned away from apex 32, thereby allowing the aforementioned rotational movement of mounting plate 20, without interference from cam 40. Such positioning can be achieved by configuration of cam 40 such that bypass portion 46, which may be defined by a portion of cam 40 that has a radius 50 that is greater than radius 68 of both first engagement portion 42 and first scalloped surface 28, extends to a distance from axis 36 that is less than height 49 of apex 32 above axis 36.

Figure 9:
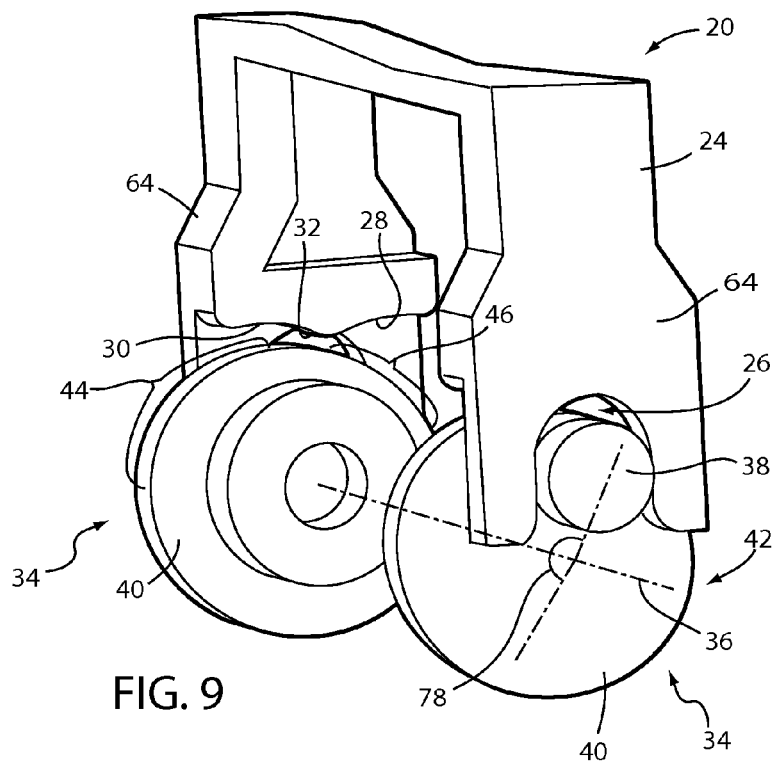
Figure 10:
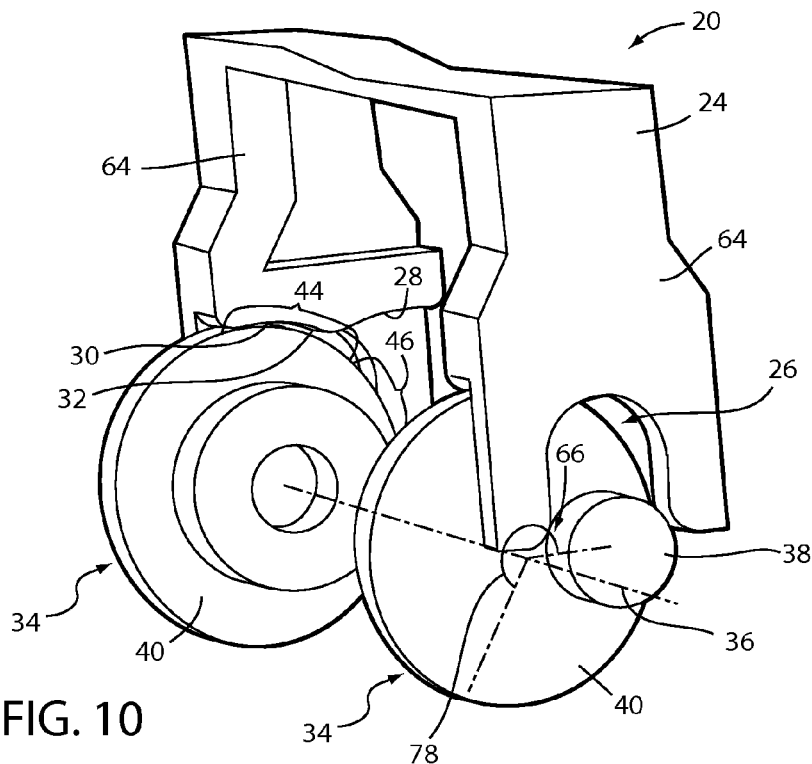
Figure 11:
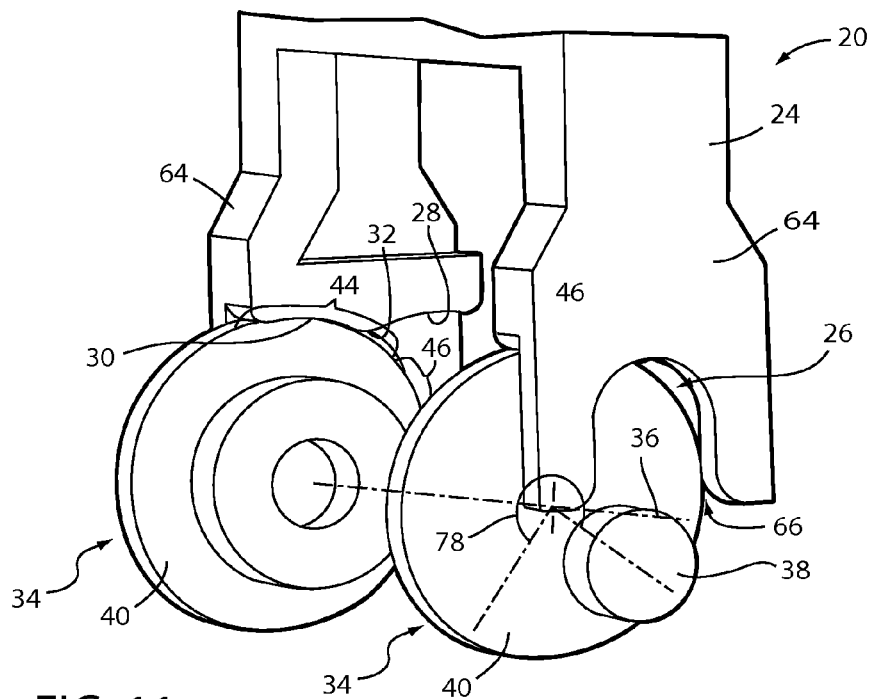
FIG. 11 is a front perspective view of a portion of the actuation mechanism in a configuration corresponding to an inactive position of the rearview mirror of FIG. 1A.

Continued rotation of wheel 34, as shown in FIG. 9, through an angle 78 approaching 180 degrees, causes continued rotation of mounting plate 20 toward the active position. As wheel 34 rotates to a rotational angle 78 of approximately 235 degrees, second engagement portion 44 begins to move into contact with second scalloped surface 30, second engagement portion 44 and second scalloped surface 30 being configured to having a similar relationship to that of first engagement portion 42 and first scalloped surface 28. Simultaneously, pin 38 beings to move out of engagement with socket 26 such that continued rotation of wheel 34 toward an angle 78 of rotation of approximately 270 degrees, as shown in FIG. 11, does not cause pin 38 to interfere with the positioning of mounting plate 20 in the active position, shown in FIG. 11. Such interference would otherwise occur due to the horizontal component of the rotational movement of pin 38 about axis 36 at angle 78 of about 270 degrees. Further, such additional rotation of wheel 30, as shown in FIG. 11, causes a compression of cam 40 by continued engagement by second engagement portion 44 with second scalloped surface 30 to help securely maintain mounting plate 20 in the active position, including during disengagement of pin 38 from socket 26.

Returning now to FIG. 1A rearview mirror 10 can include a motor 82 coupled within housing 14 and positioned laterally between extension arms 64. One or more actuation wheels 34 can be coupled with an output shaft of motor 82 such that motor 82 can drive the rotational movement of wheels 34 described above. In an embodiment motor 82 can be a 12 volt DC motor that can be configured to directly drive the rotation of wheels 34 or can include a reduction mechanism, as needed. Motor 82 can be controlled to rotate actuation wheels 34 through the above-described motion in a period of about 2 seconds or less, and can be configured to cause rotation with a torque sufficient to cause the aforementioned compression of cams 40 when in the locked state corresponding to both the active position of FIG. 11, and the inactive position of FIG. 4. Accordingly, substrate 52 can be retained in a selected one of the active position or the inactive position without requiring power to motor 82.

In an embodiment, control circuitry 62 for motor 82 can be configured to move substrate 52 to the inactive position, if necessary, upon a loss of power thereto, which can include an unexpected loss of power or upon the associated vehicle 12 being turned off. The use of the above described 12 volt DC motor in connection with rearview mirror 10, as described above, can allow for a greater tolerance in control of motor 82, due to the disengagement of pin 38 from socket 26 in the above described positions. Further, such a configuration can result in rearview mirror 10 being able to operate, as described above, in temperature conditions ranging from −40° C. to about 90° C.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

The invention claimed is:

1. A rearview mirror for a vehicle, comprising:
   a housing defining an interior cavity and an open side;
   a substrate extending within the open side of the housing and having a reflective surface thereon; and
   an actuation mechanism moveably coupling the substrate with the housing and including:
      a mounting plate rotatably coupled within the cavity of the housing at a first end of the mounting plate, the mounting plate defining a socket open opposite the first end and first and second scalloped surfaces adjacent the socket; and
      an actuation wheel including a pin, coupled within the cavity of the housing opposite the first end of the mounting plate and rotatable about an axis, the pin moving with rotation of the actuation wheel into engagement with the socket and forcing rotation of the mounting plate between a first position and a second position, the actuation wheel further including a cam alternately engageable with the first scalloped surface in a first orientation opposing movement of the mounting plate out of the first position and with the second scalloped surface in a second orientation opposing movement of the mounting plate out of the second position.

2. The rearview mirror of claim 1, wherein rotation of the actuation wheel includes rotation through a movement phase including engagement of the pin with the socket causing rotation thereof through a predetermined angle.

3. The rearview mirror of claim 1, wherein rotation of the actuation wheel includes rotation through a locking phase including disengagement of the pin from the socket and engagement of the cam with a respective one of the first and second scalloped surfaces.

4. The rearview mirror of claim 1, wherein the substrate includes a display screen, and wherein the reflective surface overlies the display screen.

5. The rearview mirror of claim 1, wherein:
   the first and second scalloped surfaces define an apex adjacent an intersection therebetween, the apex defining a minimum distance with respect to the axis during rotation of the mounting plate between the first position and the second position;
   the cam defines a bypass portion having a radius less than the minimum distance.

6. The rearview mirror of claim 1, wherein:
   the first scalloped surface is positioned at a first distance from the axis when the mounting plate is in the first position; and
   the cam defines a first engagement portion, at least a portion of which defines a second distance from the axis that is greater than the first distance, positioned on the cam such that engagement of the cam with the first scalloped surface includes compression of the cam.

7. The rearview mirror of claim 1, wherein the cam defines first engagement portion and a second engagement portion, each including a portion of the cam at a maximum distance from the axis, such portions being positioned between about 220 degrees and about 260 degrees apart about the axis.

8. The rearview mirror of claim 1, further including a motor coupled within the cavity of the housing, the actuation wheel being coupled with and rotatable about the axis by the motor.

9. The rearview mirror of claim 1, wherein the housing defines a hole adjacent the mounting plate, the mirror further including:
   a mounting structure coupled with the mounting plate and extending through the hole in the housing, the housing being moveable through an angle of about 6 degrees with respect to the mounting structure by movement of the mounting plate between the first position and the second position.

10. A rear-vision system for a vehicle, comprising:
    a video camera mounted on the vehicle in a position to capture an image of a portion of an exterior thereof; and
    a display mirror assembly, comprising:
       a substrate including a display in electronic communication with the camera for presenting the image thereon, a one-way reflective layer overlying the display;
       a mounting plate defining a first and, a socket open opposite the first end, and a first scalloped surface adjacent the socket;
       a mounting structure coupled between the mounting plate and a portion of the vehicle;
       a housing supporting the display and defining an internal cavity and being rotatably coupled with a first end of the mounting plate within in the cavity; and
       an actuation wheel coupled within the cavity of the housing and rotatable about an axis, the actuation wheel including a pin and a peripheral surface alternately respectively engageable with the socket and the first scalloped surface through a rotational motion of the actuation wheel.

11. The system of claim 10, further comprising:
    a motor mounted within the cavity of the housing, the actuation wheel being coupled with the motor to drive the rotational motion thereof; and
    control circuitry coupled with the motor for controlling the motor in driving the rotational motion of the actuation wheel.

12. The system of claim 11, wherein:
    the rotational motion of the actuation wheel moves the housing relative to the mounting plate between a first position and a second position; and
    the control circuitry is further in electronic communication with the display and automatically causes the rotational motion of the actuation wheel to move the housing between the first and second position upon one of an activation or deactivation of the display.

13. The system of claim 12, wherein when in the second position, the substrate is angled toward a headliner of the vehicle by between 5 degrees and 10 degrees relative to the first position.

14. The system of claim 10, wherein:
    the mounting plate further defines a second scalloped surface adjacent the first scalloped surface;
    the peripheral surface of the actuation wheel defines a first engagement portion and a second engagement portion alternately engageable with the first scalloped surface to secure the mounting plate in the first position and with the second scalloped surface to secure the mounting plate in the second position through the rotational motion of the actuation wheel.

15. The system of claim 10, wherein:

the housing defines a hole adjacent the mounting plate; and the mounting structure extends through the hole in the housing.

16. A vehicle, comprising:

a windshield;

a headliner adjacent an upper edge of the windshield; and a mirror assembly, comprising:

a substrate including a display and a one-way reflective layer overlying the display;

a mounting plate having a first end and defining a socket open opposite the first end and a first scalloped surface adjacent the socket;

a mounting structure coupled with the mounting plate and coupling with the vehicle adjacent the upper edge of the windshield;

a housing supporting the display and defining an internal cavity and being rotatably coupled with a first end of the mounting plate within in the cavity; and an actuation wheel coupled within the cavity of the housing and rotatable about an axis, the actuation wheel including a pin and a peripheral surface alternately respectively engageable with the socket and the first scalloped surface through a rotational motion of the actuation wheel that moves the housing relative to the mounting plate between a first position and a second position.

17. The vehicle of claim 16, wherein when in the second position, the substrate is angled toward the headliner by between 5 degrees and 10 degrees relative to the first position.

18. The vehicle of claim 16, further comprising a video camera mounted on the vehicle in a position to capture an image of a portion of an exterior thereof, wherein:

the display is in electronic communication with the camera for presenting the image thereon.

19. The vehicle of claim 18, further comprising:

a motor mounted within the cavity of the housing, the actuation wheel being coupled with the motor to drive the rotational motion thereof; and control circuitry coupled with the motor for controlling the motor in driving the rotational motion of the actuation wheel, the control circuitry further being in electronic communication with the display and automatically causing the rotational motion of the actuation wheel to move the housing between the first and second position upon one of an activation or deactivation of the display.

20. The vehicle of claim 16, wherein:

the mounting plate further defines a second scalloped surface adjacent the first scalloped surface;

the peripheral surface of the actuation wheel defines a first engagement portion and a second engagement portion alternately engageable with the first scalloped surface in a position opposing movement of the mounting plate out of the first position and with the second scalloped surface in a position opposing movement of the mounting plate out of the second position through the rotational motion of the actuation wheel.

* * * * *